United States Patent [19]

Stroschin et al.

[11] Patent Number: 5,453,926
[45] Date of Patent: Sep. 26, 1995

[54] TOUCH SCREEN SYSTEM FOR A WEB FOLDER

[75] Inventors: James P. Stroschin, Milwaukee; Thomas A. Halverson, Wauwatosa, both of Wis.

[73] Assignee: Quad/Tech, Inc., Pewaukee, Wis.

[21] Appl. No.: 248,476

[22] Filed: May 25, 1994

[51] Int. Cl.[6] .................................................. G05B 15/00
[52] U.S. Cl. ........................... 364/188; 364/131; 364/138
[58] Field of Search ........................ 364/188–193, 364/131–138; 493/439, 456; 270/41; 395/152, 155–161

[56] References Cited

U.S. PATENT DOCUMENTS

| | | |
|---|---|---|
| 4,421,501 | 12/1983 | Scheffer .................................. 493/439 |
| 4,831,548 | 5/1989 | Matoba et al. ........................... 364/188 |
| 4,847,775 | 7/1989 | Roch et al. .............................. 364/190 |
| 4,870,561 | 9/1989 | Love et al. .............................. 364/190 |
| 4,942,514 | 7/1990 | Miyagaki et al. ....................... 364/190 |
| 5,046,022 | 9/1991 | Conway et al. ......................... 364/190 |
| 5,230,501 | 7/1993 | Melton ...................................... 270/41 |

Primary Examiner—James P. Trammell
Attorney, Agent, or Firm—Michael, Best & Friedrich

[57] ABSTRACT

Disclosed herein is a method of manufacturing a display for a touch screen control system which is used to control plow heads in a web folder machine, the method comprising the steps of providing a touch screen interface; taking a picture of the plow head; digitizing the picture to create a digitized image of the plow head; and displaying the digitized image of the plow head on the touch screen interface.

39 Claims, 29 Drawing Sheets

Fig. 7

| BAB # 0 | LEAD-IN CONFIGURATION | | | | 09:41 AM MON. OCT 4, 1993 |
|---|---|---|---|---|---|
| | | WEB 1 | | WEB 2 | |
| RIBBON: | 1 | 2 | 3 | 4 | |
| BAR PRESET: | 0.00 | 0.00 | 0.00 | 0.00 | |
| BAR ACTUAL: | 1***** | 2***** | 4***** | 5***** | |
| RIBBON EXITS COMP TOWARDS: | ? | ? | ? | ? | |
| COMPENSATOR PRESET: | 0.00 | 0.00 | 0.00 | 0.00 | |
| COMPENSATOR ACTUAL: | 5***** | 5***** | 7***** | 8***** | |

| EDIT | ASSIGN | PRESET | STOP | CALIBRATE | JOBS | PLOW | RESTART |

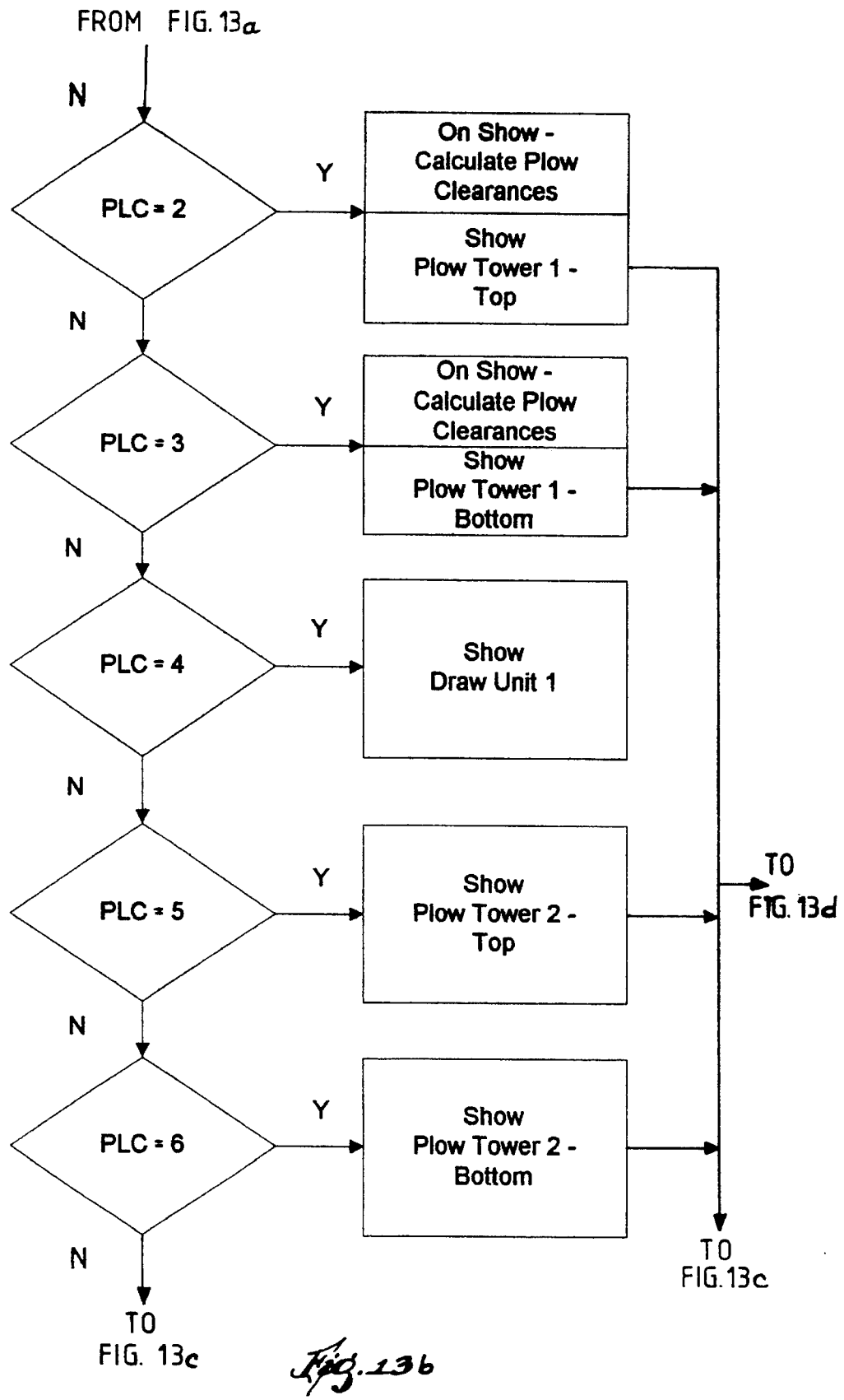

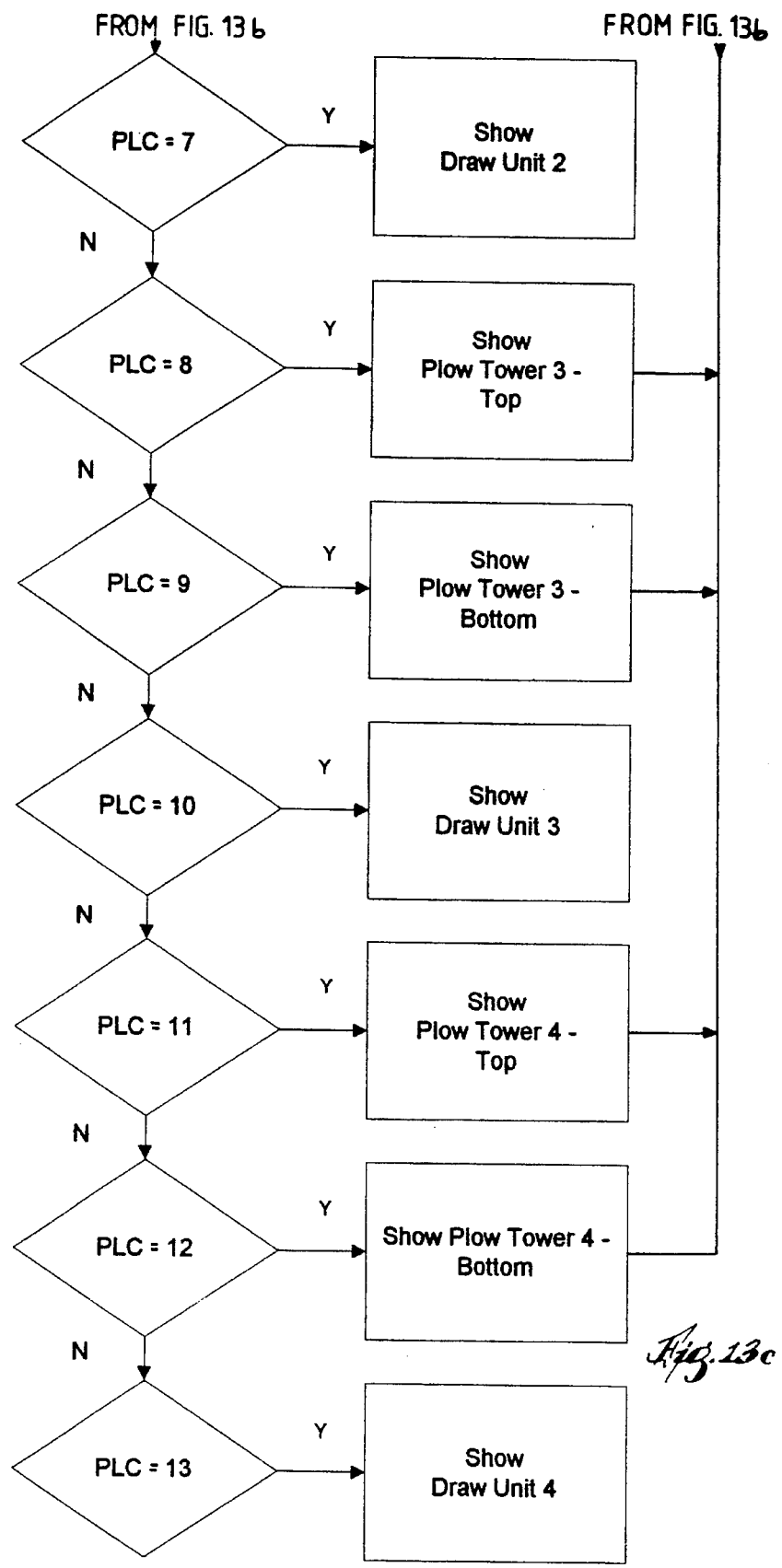

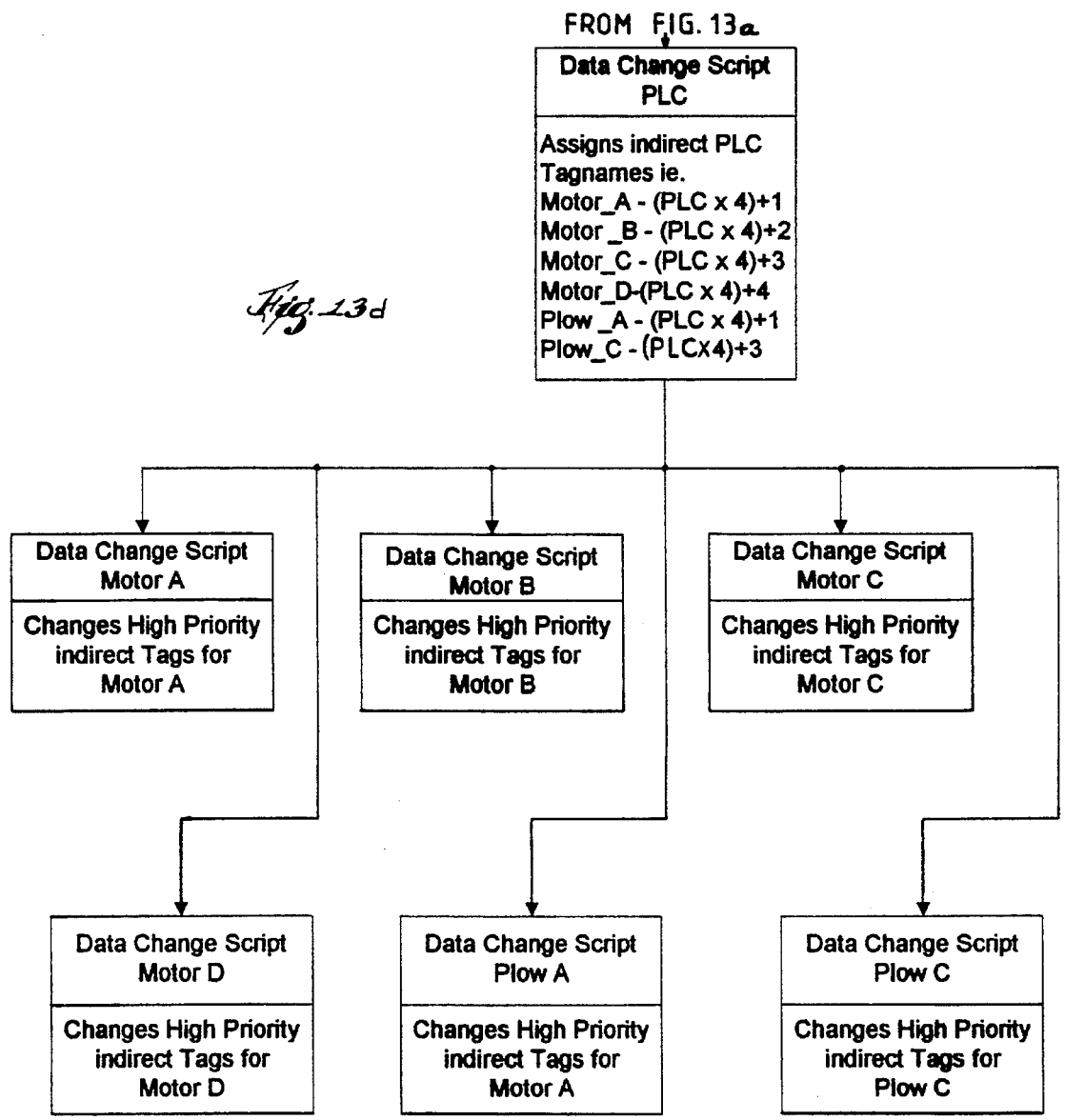
Fig. 13d
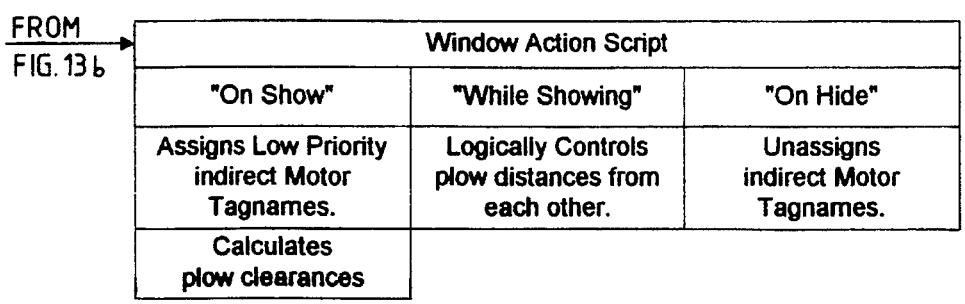

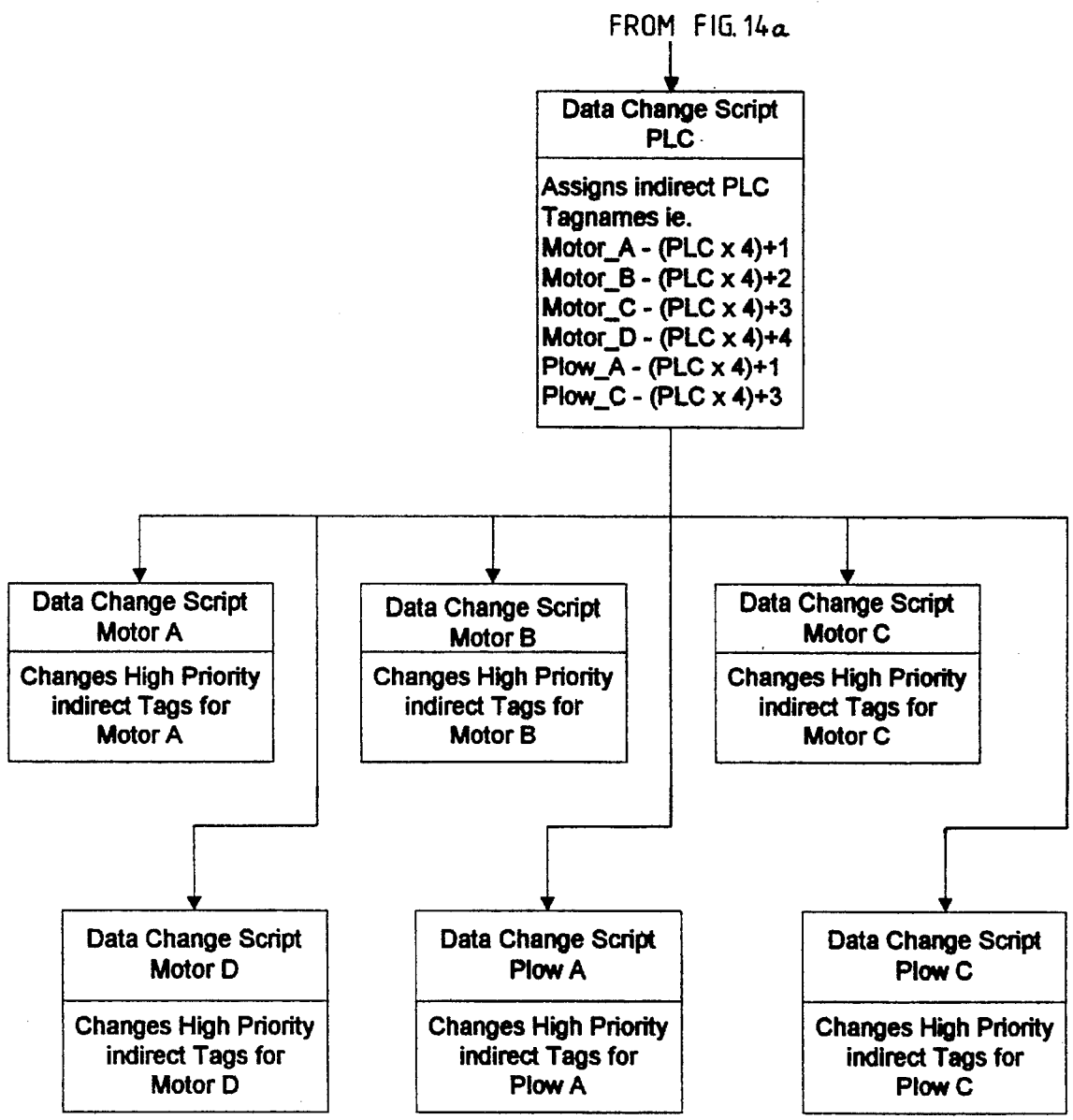
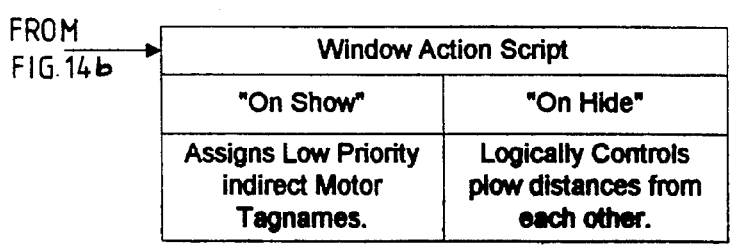
Fig. 14d

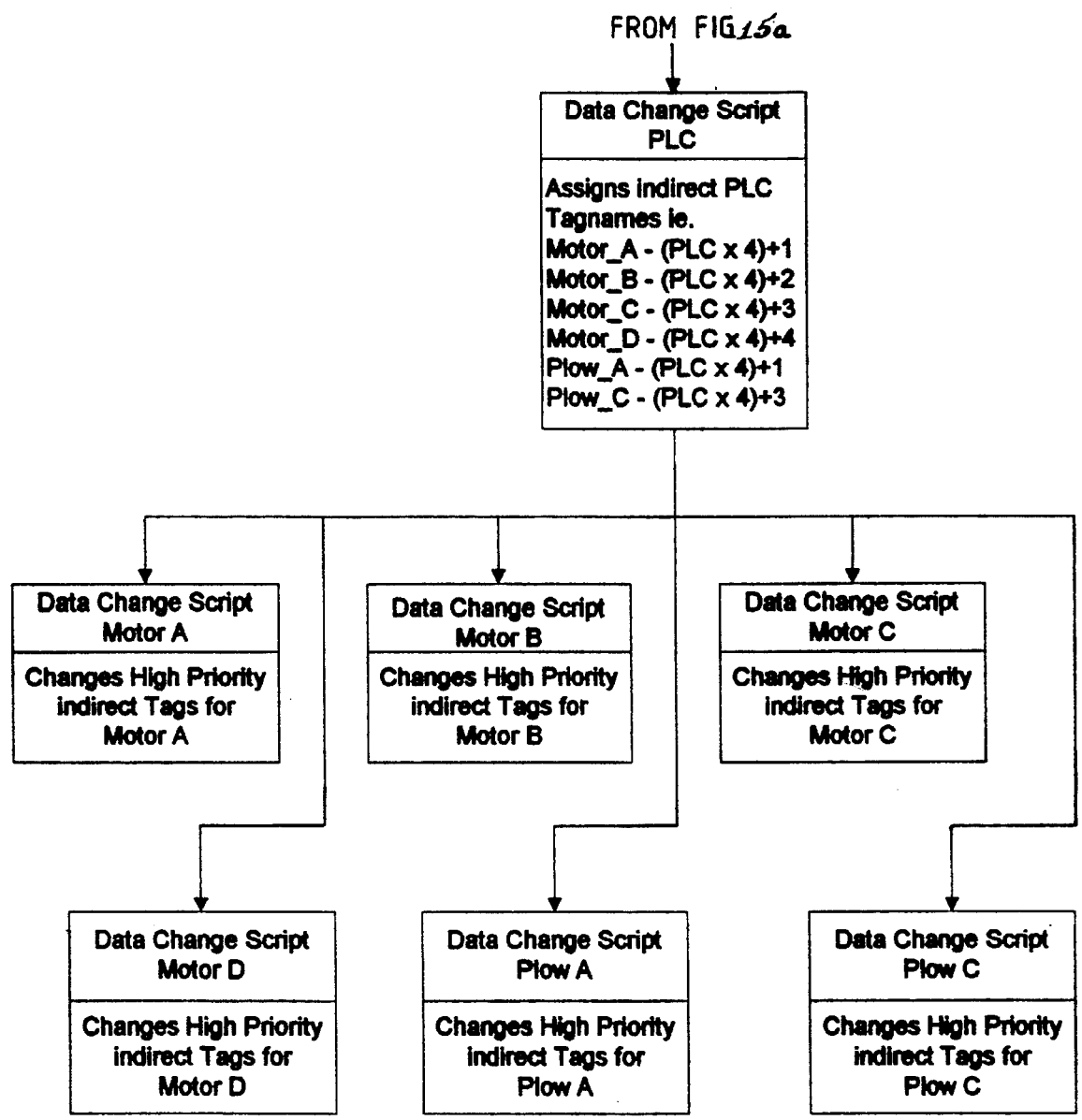
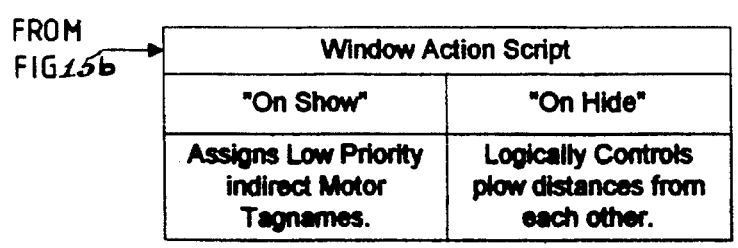
Fig. 15 d

G.E. FANUC SERIES 90-30 PLC SHARED MEMORY ASSIGNMNETS

FIRST PRIORITY COMMUNICATIONS

| COMMOM PC - PLC | COMMON PLC - PC | MOTOR 1 - 4 PC - PLC | MOTOR 1 - 4 PLC - PC |
|---|---|---|---|
| M1 - M4 | M5 - M8 | M9 - M28 | M29 - M64 |
| R1 - R4 | R1 - R4 | R5 - R12 | R13 - R32 |

SECOND PRIORITY COMMUNICATIONS

| COMMON PC - PLC | COMMON PLC - PC | MOTOR 1-4 PC - PLC | MOTOR 1-4 PLC - PC |
|---|---|---|---|
| M65 - M68 |  | M69 - M84 | M85 - M128 |
| R33 - R35 | R36 - R36 | R37 - R64 | R65 - R80 |
|  |  | R81 - R112 |  |

INTERNAL

| MOTOR 1 | MOTOR 2 | MOTOR 3 | MOTOR 4 | COMMON |
|---|---|---|---|---|
| M150 - M192 | M150 - M192 | M250 - M292 | M350 - M392 | M129 - M149 |
| R150 - R169 | R250 - R269 | R350 - R369 | R450 - R469 | R470 - R494 |
|  |  |  |  | R113 - R136 |

Fig. 16

FIRST PRIORITY COMMUNICATIONS
PC - PLC0-13

ALL MOTORS

M1 = CALIBRATE ALL MOTORS    R1-R4 = SPARE
M2 = STOP ALL MOTORS
M3 = PRESET ALL MOTORS
M4 = SPARE

MOTORS 1-4

M9 = MOTOR 1 MANUAL FORWARD    R5 = MOTOR 1 PRESET POSITION (LSW)
M10 = MOTOR 2 MANUAL FORWARD    R6 = MOTOR 1 PRESET POSITION (MSW)
M11 = MOTOR 3 MANUAL FORWARD    R7 = MOTOR 2 PRESET POSITION (LSW)
M12 = MOTOR 4 MANUAL FORWARD    R8 = MOTOR 2 PRESET POSITION (MSW)
M13 = MOTOR 1 MANUAL REVERSE    R9 = MOTOR 3 PRESET POSITION (LSW)
M14 = MOTOR 2 MANUAL REVERSE    R10 = MOTOR 3 PRESET POSITION (MSW)
M15 = MOTOR 3 MANUAL REVERSE    R11 = MOTOR 4 PRESET POSITION (LSW)
M16 = MOTOR 4 MANUAL REVERSE    R12 = MOTOR 4 PRESET POSITION (MSW)
M17 = MOTOR 1 PRESET
M18 = MOTOR 2 PRESET
M19 = MOTOR 3 PRESET
M20 = MOTOR 4 PRESET
M21 = MOTOR 1 STOP
M22 = MOTOR 2 STOP
M23 = MOTOR 3 STOP
M24 = MOTOR 4 STOP
M25-M28 = SPARE

Fig. 17

FIRST PRIORITY COMMUNICATIONS
PLC0-13 - PC

ALL MOTORS

M5 = SPARE
M6 = ANY MOTOR STALL
M7 = ANY MOTOR MOVING
M8 = SPARE

R1-R4 = SPARE

MOTORS 1-4

M29 = MOTOR 1 PLUS LIMIT
M30 = MOTOR 2 PLUS LIMIT
M31 = MOTOR 3 PLUS LIMIT
M32 = MOTOR 4 PLUS LIMIT
M33 = MOTOR 1 MINUS LIMIT
M34 = MOTOR 2 MINUS LIMIT
M35 = MOTOR 3 MINUS LIMIT
M36 = MOTOR 4 MINUS LIMIT
M37 = MOTOR 1 FORWARD MOTION
M38 = MOTOR 2 FORWARD MOTION
M39 = MOTOR 3 FORWARD MOTION
M40 = MOTOR 4 FORWARD MOTION
M41 = MOTOR 1 REVERSE MOTION
M42 = MOTOR 2 REVERSE MOTION
M43 = MOTOR 3 REVERSE MOTION
M44 = MOTOR 4 REVERSE MOTION
M45 = MOTOR 1 FORWARD STALL
M46 = MOTOR 2 FORWARD STALL
M47 = MOTOR 3 FORWARD STALL
M48 = MOTOR 4 FORWARD STALL
M49 = MOTOR 1 REVERSE STALL
M50 = MOTOR 2 REVERSE STALL
M51 = MOTOR 3 REVERSE STALL
M52 = MOTOR 4 REVERSE STALL
M53-M64 = SPARE

R13 = MOTOR 1 CURRENT POSITION (LSW)
R14 = MOTOR 1 CURRENT POSTION (MSW)
R15 = MOTOR 2 CURRENT POSITION (LSW)
R16 = MOTOR 2 CURRENT POSITION (MSW)
R17 = MOTOR 3 CURRENT POSTION (LSW)
R18 = MOTOR 3 CURRENT POSITION (MSW)
R19 = MOTOR 4 CURRENT POSITION (LSW)
R20 = MOTOR 4 CURRENT POSITION (MSW)
R21-R32 = SPARE

Fig. 18

SECOND PRIORITY COMMUNICATIONS
PC - PLC0-13

ALL MOTORS

R33 = STALL TIMEOUT IN .1 sec.
R34 = CALIBRATE BACK-OFF DIST. (LSW)
R35 = CALIBRATE BACK-OFF DIST. (MSW)

MOTOR 1-4

| | |
|---|---|
| M69 = MTR 1 ENCODER CFG REV | R37 = MOTOR 1 SCALE FACTOR |
| M70 = MTR 2 ENCODER CFG REV | R38 = MOTOR 2 SCALE FACTOR |
| M71 = MTR 3 ENCODER CFG REV | R39 = MOTOR 3 SCALE FACTOR |
| M72 = MTR 4 ENCODER CFG REV | R40 = MOTOR 4 SCALE FACTOR |
| M73 = MTR 1 MOTOR CFG REV | R41 = MOTOR 1 ASSIGN POSITION (LSW) |
| M74 = MTR 2 MOTOR CFG REV | R42 = MOTOR 1 ASSIGN POSITION (MSW) |
| M75 = MTR 3 MOTOR CFG REV | R43 = MOTOR 2 ASSIGN POSITION (LSW) |
| M76 = MTR 4 MOTOR CFG REV | R44 = MOTOR 2 ASSIGN POSITION (MSW) |
| M77 = MTR 1 POSITION ASSIGN | R45 = MOTOR 3 ASSIGN POSITION (LSW) |
| M78 = MTR 2 POSITION ASSIGN | R46 = MOTOR 3 ASSIGN POSITION (MSW) |
| M79 = MTR 3 POSITION ASSIGN | R47 = MOTOR 4 ASSIGN POSITION (LSW) |
| M80 = MTR 4 POSITION ASSIGN | R48 = MOTOR 4 ASSIGN POSITION (MSW) |
| M81-M84 = SPARE | R49 = MOTOR 1 MINUS LMT OFFSET (LSW) |
| | R50 = MOTOR 1 MINUS LMT OFFSET (MSW) |
| R81 = MTR 1 FORWARD LIMIT POINTER | R51 = MOTOR 2 MINUS LMT OFFSET (LSW) |
| R82 = MTR 2 FORWARD LIMIT POINTER | R52 = MOTOR 2 MINUS LMT OFSET (MSW) |
| R83 = MTR 3 FORWARD LIMIT POINTER | R53 = MOTOR 3 MINUS LMT OFFSET (LSW) |
| R84 = MTR 4 FORWARD LIMIT POINTER | R54 = MOTOR 3 MINUS LMT OFFSET (MSW) |
| R85 = MTR 1 REVERSE LIMIT POINTER | R55 = MOTOR 4 MINUS LMT OFFSET (LSW) |
| R86 = MTR 2 REVERSE LIMIT POINTER | R56 = MOTOR 4 MINUS LMT OFFSET (MSW) |
| R87 = MTR 3 REVERSE LIMIT POINTER | R57 = MOTOR 1 CALIBRATE SEQUENCE |
| R88 = MTR 4 REVERSE LIMIT POINTER | R58 = MOTOR 2 CALIBRATE SEQUENCE |
| R89 = MTR 1 FWD LIMIT DELTA (LSW) | R59 = MOTOR 3 CALIBRATE SEQUENCE |
| R90 = MTR 1 FWD LIMIT DELTA (MSW) | R60 = MOTOR 4 CALIBRATE SEQUENCE |
| R91 = MTR 2 FWD LIMIT DELTA (LSW) | R61-R64 = SPARE |
| R92 = MTR 2 FWD LIMIT DELTA (MSW) | |
| R93 = MTR 3 FWD LIMIT DELTA (LSW) | |
| R94 = MTR 3 FWD LIMIT DELTA (MSW) | |
| R95 = MTR 4 FWD LIMIT DELTA (LSW) | |
| R96 = MTR 4 FWD LIMIT DELTA (MSW) | |
| R97 = MTR 1 REV LIMIT DELTA (LSW) | |
| R98 = MTR 1 REV LIMIT DELTA (MSW) | |
| R99 = MTR 2 REV LIMIT DELTA (LSW) | |
| R100= MTR 2 REV LIMIT DELTA (MSW) | |
| R101= MTR 3 REV LIMIT DELTA (LSW) | |
| R102= MTR 3 REV LIMIT DELTA (MSW) | |
| R103= MTR 4 REV LIMIT DELTA (LSW) | |
| R104= MTR 4 REV LIMIT DELTA (MSW) | |
| R105-R112 = SPARE | |

Fig. 19

SECOND PRIORITY COMMUNICATIONS
PLC0-13 - PC

ALL MOTORS

M65 = HSC COMM REQ ERROR            R36 = SOFTWARE REV. NO. X.X.X
M66-M68 = SPARE

MOTOR 1-4

M85-M128 = SPARE                    R65 = MOTOR 1 PLUS SOFT LIMIT (LSW)
                                    R66 = MOTOR 1 PLUS SOFT LIMIT (MSW)
                                    R67 = MOTOR 2 PLUS SOFT LIMIT (LSW)
                                    R68 = MOTOR 2 PLUS SOFT LIMIT (MSW)
                                    R69 = MOTOR 3 PLUS SOFT LIMIT (LSW)
                                    R70 = MOTOR 3 PLUS SOFT LIMIT (MSW)
                                    R71 = MOTOR 4 PLUS SOFT LIMIT (LSW)
                                    R72 = MOTOR 4 PLUS SOFT LIMIT (MSW)
                                    R73 = MOTOR 1 MINUS SOFT LIMIT (LSW)
                                    R74 = MOTOR 1 MINUS SOFT LIMIT (MSW)
                                    R75 = MOTOR 2 MINUS SOFT LIMIT (LSW)
                                    R76 = MOTOR 2 MINUS SOFT LIMIT (MSW)
                                    R77 = MOTOR 3 MINUS SOFT LIMIT (LSW)
                                    R78 = MOTOR 3 MINUS SOFT LIMIT (MSW)
                                    R79 = MOTOR 4 MINUS SOFT LIMIT (LSW)
                                    R80 = MOTOR 4 MINUS SOFT LIMIT (MSW)

Fig. 20

HARDWIRED GLOBAL INTERCONNECTIONS

PC - PLCX

M1 = GLOBAL CALIBRATE ALL MOTORS
M2 = GLOBAL STOP ALL MOTORS
M3 = GLOBAL PRESET ALL MOTORS
M4 = SPARE

PLCX - PC

M5 = SPARE
M6 = GLOBAL ANY MOTOR STALL
M7 = GLOBAL ANY MOTOR MOVING
M8 = SPARE

PLC0-13 - PLCX

ANY MTR STALL
PLC0_Q10 ----------- PLCX_I1
PLC1_Q10 ----------- PLCX_I2
PLC2_Q10 ----------- PLCX_I3
PLC3_Q10 ----------- PLCX_I4
PLC4_Q10 ----------- PLCX_I5
PLC5_Q10 ----------- PLCX_I6
PLC6_Q10 ----------- PLCX_I7
PLC7_Q10 ----------- PLCX_I8
PLC8_Q10 ----------- PLCX_I9
PLC9_Q10 ----------- PLCX_I10
PLC10_Q10 ----------- PLCX_I11
PLC11_Q10 ----------- PLCX_I12
PLC12_Q10 ----------- PLCX_I13
PLC13_Q10 ----------- PLCX_I14

ANY MTR MOVE
PLC0_Q9 ----------- PLCX_I17
PLC1_Q9 ----------- PLCX_I18
PLC2_Q9 ----------- PLCX_I19
PLC3_Q9 ----------- PLCX_I20
PLC4_Q9 ----------- PLCX_I21
PLC5_Q9 ----------- PLCX_I22
PLC6_Q9 ----------- PLCX_I23
PLC7_Q9 ----------- PLCX_I24
PLC8_Q9 ----------- PLCX_I25
PLC9_Q9 ----------- PLCX_I26
PLC10_Q9 ----------- PLCX_I27
PLC11_Q9 ----------- PLCX_I28
PLC12_Q9 ----------- PLCX_I29
PLC13_Q9 ----------- PLCX_I30

PLCX - PLC0-13

GLOBAL CAL ALL MTRS
PLCX_Q1 ----------------------- PLC0/13_I33
GLOBAL STOP ALL MTRS
PLCX_Q2 ----------------------- PLC0/13_I34
GLOBAL STOP ALL MTRS
PLCX_Q3 ----------------------- PLC0/13_I35

Fig. 21

TOUCH SCREEN SYSTEM FOR A WEB FOLDER

BACKGROUND OF THE INVENTION

The present invention relates generally to control systems employing touch screens. More particularly, the invention relates to touch screen controls for the printing industry.

Touch screens displays information, and accepts inputs from a human operator who touches designated parts of the screen at certain times. Such touch screens are used in various applications including control of printing equipment and operations. For example, such touch screens are commonly used in instant teller machines, and are used for providing information in malls, airports, etc. Typically, the touch screen will display several boxes with writing in the boxes. Depending on which box is touched, another menu will appear on the screen, information will be displayed, or some action will be taken (e.g., cash will be dispensed, directions will be printed, etc.). The touch screen system will typically have a hierarchy of menus.

An example of a touch screen system is described in U.S. Pat. No. 4,847,775, issued to Roch et al. and incorporated herein by reference, which includes an apparatus for controlling the setting of the components of a printing and cutting machine or a folder-gluer machine. The apparatus includes a computer having a touch screen for permitting direct control and setting of the components of the printing and cutting machine. A desired function can be selected by touching its graphic representation on the screen. A submenu will then be displayed. As soon as the operator removes his or her finger from the screen, the following functions may be selected; graphic display of the registration marks; assignment of specific marks to the recto-verso printing stations; assignment of the color of the selected marks; assignment of each mark to a printing or cutting station. After the machine operating parameters are set, the machine can be started by touching the screen.

Another touch screen system is proposed U.S. Pat. No. 4,942,514, issued to Miyagaki et al. on Jul. 17, 1990, which is incorporated herein by reference. The Miyugaki et al. patent discloses a device which includes a touch screen 4 that displays a diagram of the devices that are controlled (see FIG. 1B).

Folder machines are known in the printing industries. Such folders create folds in paper travelling through the folder. One folder machine is disclosed in U.S. Pat. No. 4,421,501, which is incorporated herein by reference.

SUMMARY OF THE INVENTION

The invention provides a method of creating a display for a touch screen control system which is used to control the position of a component, the method comprising the steps of providing a touch screen interface, taking a picture of the component that is to be controlled, digitizing the picture to create a digitized image of the component, and displaying the digitized image of the component on the touch screen interface.

One embodiment of the invention provides a method of manufacturing a display for a touch screen control system which is used to control plow heads in a web folder machine, the method comprising the steps of: providing a touch screen interface, taking a picture of the plow head, digitizing the picture to create a digitized image of the plow head, and displaying the digitized image of the plow head on the touch screen interface.

One embodiment of the invention provides a method of manufacturing a web folder machine, the method comprising the steps of: providing a plurality of folder units including an angle bar unit, a compensator unit, a plow unit having plow heads, and a draw unit, and connecting a motor to each plow head such that operation of the motor causes movement of the plow head, providing a control system including the steps of providing a computer, a touch screen interface, and a plurality of PLCs, connecting the computer to the touch screen interface and to the PLCs, and connecting four of the motors to each PLC, taking a picture of at least one of the plow heads, digitizing the picture to create a digitized image of the plow head, and displaying the digitized image of the plow head on the touch screen interface such that the displayed digitized image moves on the touch screen interface when the actual plow head moves.

One embodiment of the invention provides a folder machine for folding a travelling web, the folder machine comprising a plurality of plow heads, a computer, a plurality of PLCs connected to the computer, a plurality of motors connected to each PLC and respectively drivingly connected to the plow heads for selectively moving the plow heads, and a touch screen interface connected to the computer, wherein a photorealistic image of a plow head is displayed on the touch screen, which photorealistic image moves on the display in response to movement of one of the plow heads.

Other features and advantages of the invention will become apparent to those of ordinary skill in the art upon review of the following detailed description, claims, and drawings.

BRIEF DESCRIPTION OF THE DRAWINGS

FIG. 7 illustrates a lead-in configuration display that can be selected to appear on the touch screen of the folder of FIG. 1.

FIGS. 16–21 are pages of computer code documenting various memory assignments and global interconnect signals.

DETAILED DESCRIPTION OF THE PREFERRED EMBODIMENT OF THE INVENTION

Figure 1:
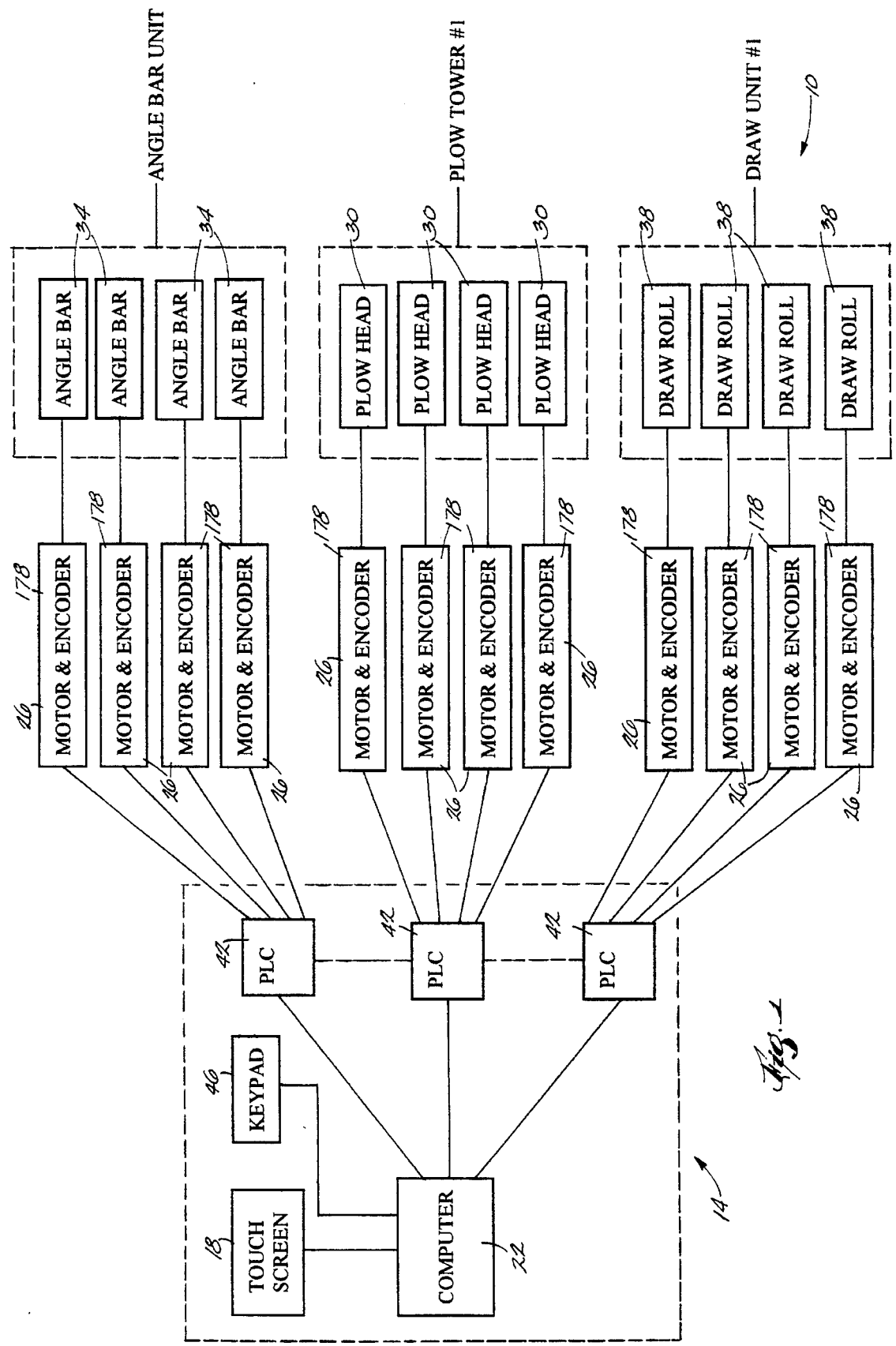
FIG. 1 is block diagram illustrating a folder embodying various aspects of the invention.
Figure 2:
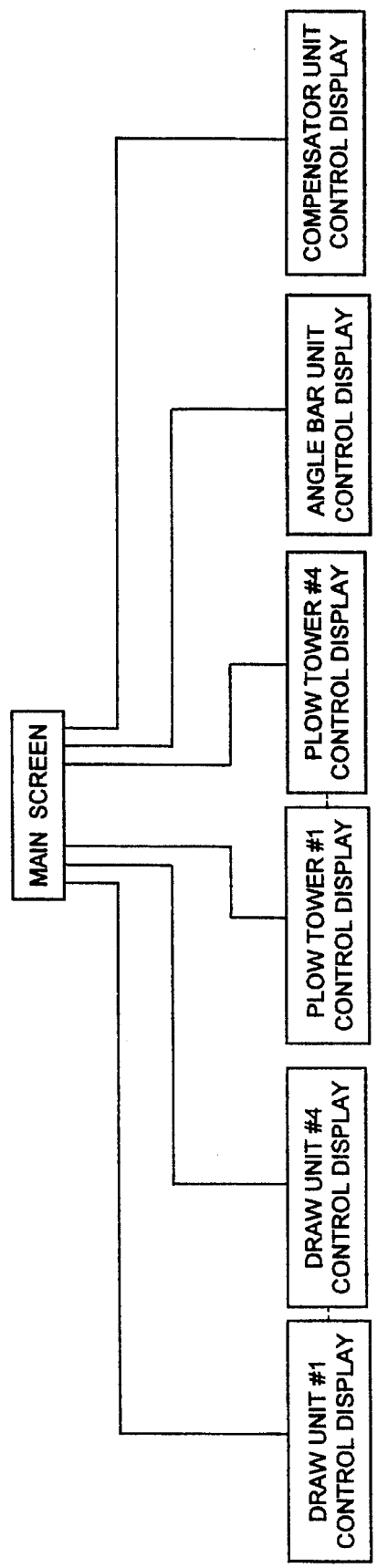
FIG. 2 is a flow diagram illustrating the hierarchy of some displays that can be selected using a touch screen interface included in the folder of FIG. 1.

Shown in the various figures is a web folder 10 embodying various features of the invention.

The folder 10 includes a control system 14 for controlling various motors or other equipment. The control system 14 includes an operator interface in the form of a capacitive touch screen 18. While other touch screens could be employed, in the illustrated embodiment, the touch screen 18 is a Microvitek Microtouch 19" capacitive touch screen.

The control system 14 further includes a main computer 22 connected to the touch screen 18. While other computers could be employed, in the illustrated embodiment the main computer 22 is an IBM compatible personal computer with an Intel microprocessor, such as an 8088, 8086, 286, 386, 486 or Pentium microprocessor or clone thereof. More particularly, in the illustrated embodiment, the main computer 22 is a TMC G486 DX-33MHz single board computer including 20 Megabytes of Ram, a 120 Megabyte hard drive, an ATI Graphics Ultra+ 24-bit graphics accelerator, a Quatech QS-300D four channel RS-422/485 asynchronous communications adapter, and an Electrohome 19" monitor model 38-K32ISE-X1 (separate from the touch screen 18). A mini or mainframe computer could also be employed, although this may add expense. While other software could be employed, in the illustrated embodiment the main computer is loaded with a Windows operating system, available from Microsoft Corporation, and with GE Fanuc Cimplicity InTouch software, including GE Fanuc Cimplicity InTouch Runtime System, version 4.10, GE Fanuc Cimplicity InTouch Development System, version 4.10, GE Fanuc Cimplicity InTouch Recipe for InTouch, version 4.10, and Ge Fanuc Cimplicity InTouch DDE Servers, Series 900, version 4.0. The main computer is also loaded with GE Fanuc Logicmaster 90-30/20S software, version 4.01, IC641SWP306G. The InTouch software is used so that the touch screen 18 is set up to act as a Windows mouse. In other words, instead of using a mouse to point and click on a certain button on a screen, an operator can instead touch the button on the touch screen 18.

In the illustrated embodiment, the control system 14 controls various motors 26, which motors 26 move folder components such as plow heads 30, angle bars 34, compensators, and draw rolls 38, and the touch screen 18 shows the positions of the folder components (e.g., plow heads, angle bars, etc.), and movement of the folder components. In the preferred embodiment, each motor 26 is a Superior Electric SLO-SYN Synchronous Stepping Motor, SS421-2005.

Plow heads 30, angle bars 34, and other folder components are well known in the printing art, and will not be described herein in detail. For example, folder components are described in U.S. Pat. No. 5,230,501, issued to Melton on Jul. 27, 1993, assigned to the assignee of the present invention, and incorporated herein by reference. Angle bars 34 serve to associate a first ribbon and a third ribbon on top of one another, where the first ribbon and third ribbon have been created by splitting a single web into three ribbons. A compensator unit serves to lengthen and shorten the alignment travel distance of these same ribbons.

The control system 14 includes a PLC (programmable logic controller) 42 for every four motors 26, which PLC controls positioning of the four motors 26 connected thereto. In the preferred embodiment, each PLC 42 includes a GE Fanuc series 90–30 6k CPU with a 5 slot rack, model number IC693CPU311; a GE Fanuc 30 Watt power supply, model number IC693PWR321CA, two GE Fanuc 16 point 24VDC input modules, model number IC693MDL645; and a GE Fanuc 8 point 24 VDC output module, model number IC693MDL732. The main computer 22 is connected to the PLCs 42. The main computer provides supervisory control over the PLCs 42, but the PLCs 42 themselves are primarily responsible for controlling the motors 26.

Figure 10:
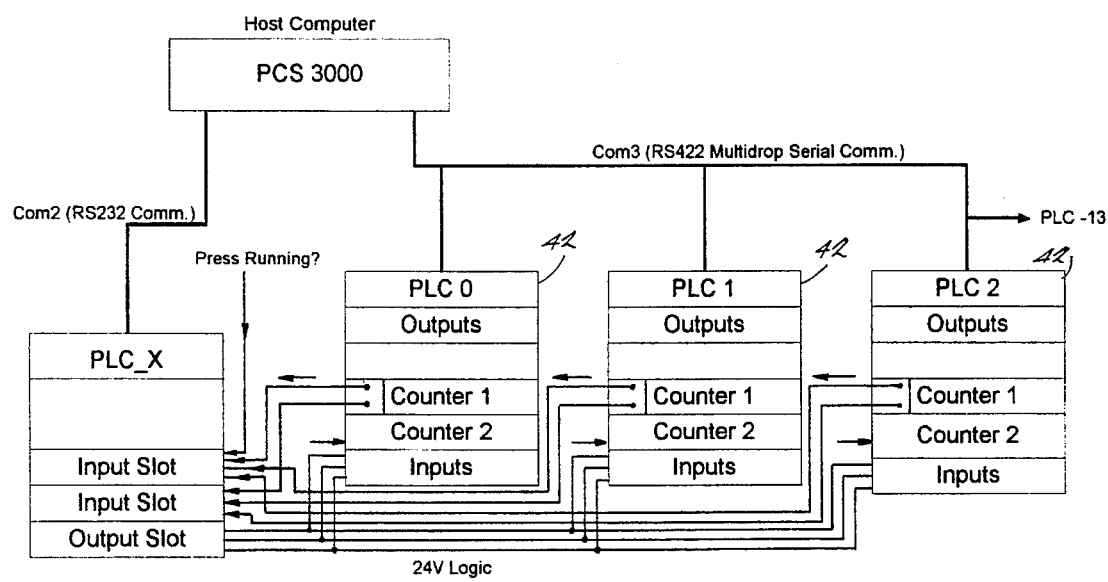
FIG. 10 illustrates how PLCs and a main computer employed in the folder are connected together.

Optionally, but preferably, the control system 14 further includes an additional main PLC ("PLC_X") interposed between the main computer 22 and the motor PLCs 42. This is for the purpose of speeding communications between the main computer 22 and the motor PLCs 42. If this main PLC is not used, it would take about two seconds for the main computer 22 to communicate serially (via RS422) to each motor PLC 42 in turn. This delay is overcome by hardwiring PLC_X to the PLCs 42 using 24 VDC logic, by connecting the main PLC to a serial port of the main computer 22, and by connecting the PLCs 42 to another serial port of the main computer 22 using an RS422 multidrop serial communication and using GE Series 90 SNP protocol (see FIG. 10). In the preferred embodiment, PLC_X includes a GE Fanuc series 90–30 6k CPU, with a 5 slot rack, model number IC693CPU311; a GE Fanuc 30 W power supply, model number IC693PWR321CA, two GE Fanuc High Speed 80 kHz control modules, model number IC693APU300; and a GE Fanuc 8 point output module, 240 VAC, model number IC693MDL732.

There are certain global commands that need to be sent to all of the PLCs 42 simultaneously. These are Calibrate all Motors, Preset all Motors, and Stop all Motors. There is one output wire, wired in parallel to each PLC 42, for each of these commands. The main computer 22 sends such global commands directly to the main PLC, and PLC_X communicates directly to all of the PLCs 42 using 24 V DC logic.

As previously indicated, there are two 16 point input slots on PLC_X. One of these input slots is used to detect if any of the motors 26 is stalled, and to detect if the press (i.e., the folder) is operating.

Figure 11:
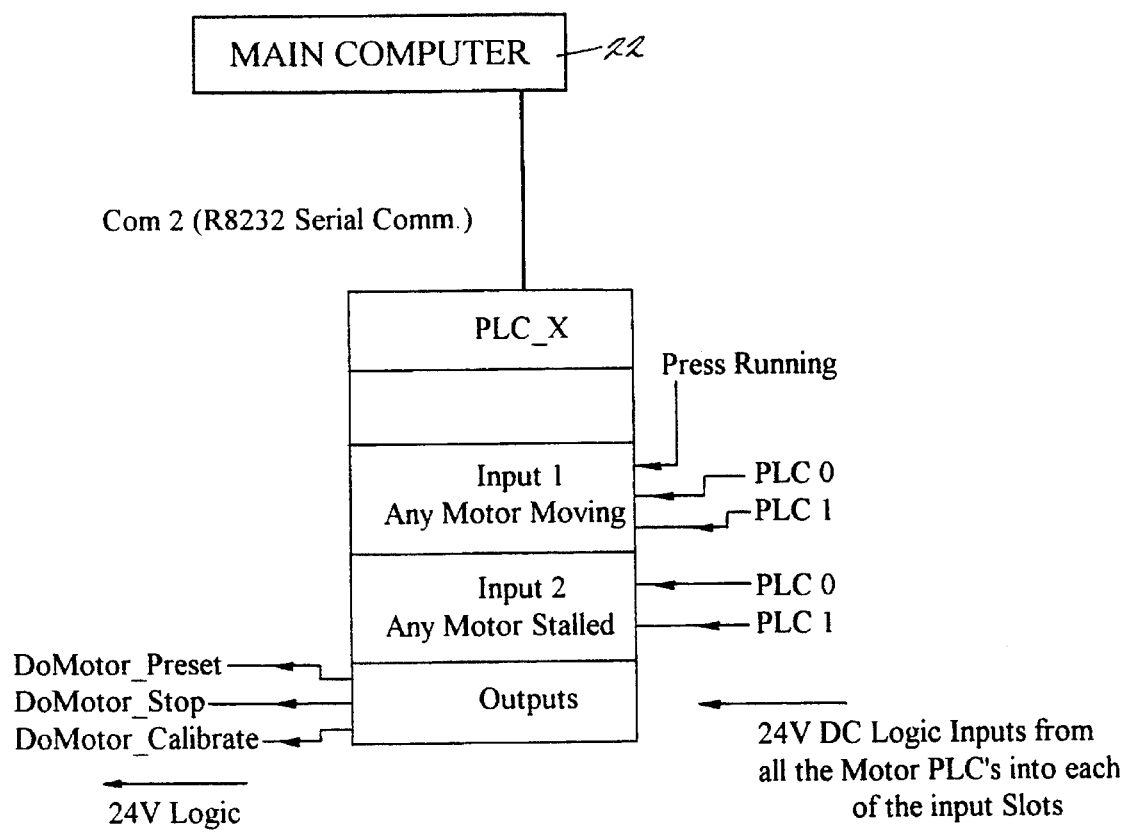
FIG. 11 illustrates in detail how a main PLC is connected to the main computer and to other PLCs.

The second input slot on PLC_X is used to detect if any motor 26 is moving. The inputs are wired differently than the outputs of PLC_X in that there are individual wires coming into the inputs of PLC_X from each PLC 42, and also a single input from the press (i.e., the folder). See FIG. 11.

More particularly, for communicating Motor Moving and Motor Stalled conditions, two wires are respectively connected from the output of each PLC 42 to the input cards of PLC_X. Using 24 V DC logic, each point 1–14 on the first input slot of PLC_X determines if any motor 26 is moving on a PLC 42, and point 16 determines if the press is running. Each point 1–14 on the second input slot of PLC_X determines if any motor 26 has stalled on a PLC 42.

Figure 12:
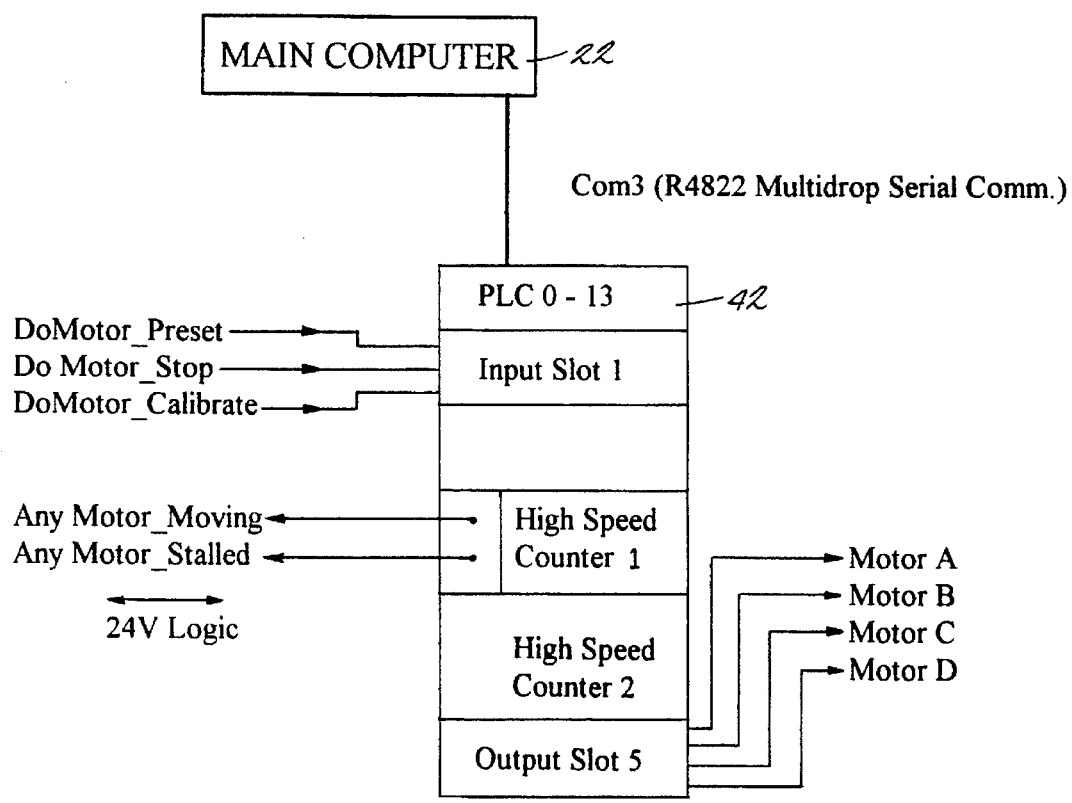
FIG. 12 illustrates in detail how a motor PLC is connected to the main computer and to the main PLC.
Figure 13A:
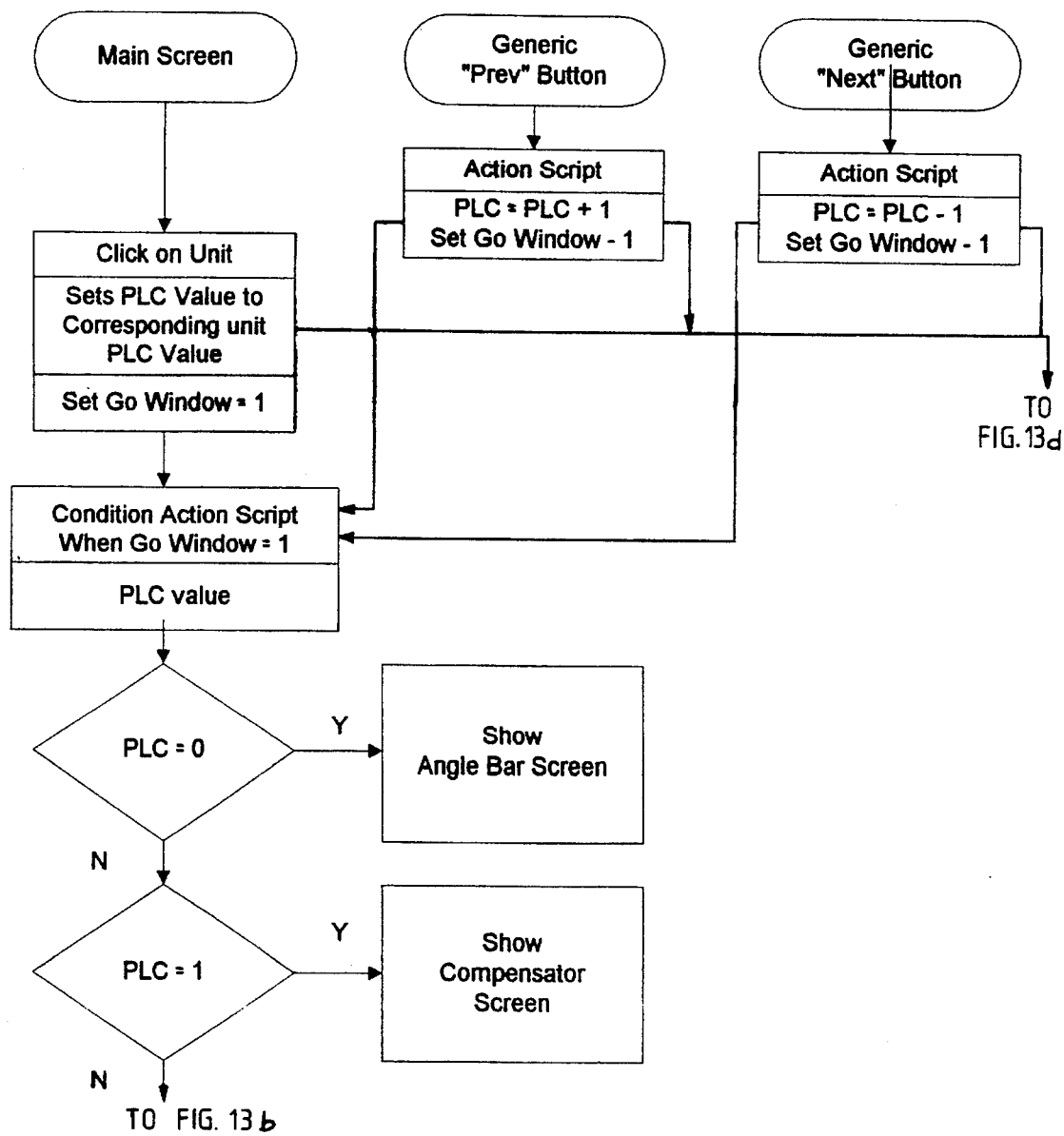
FIGS. 13–15 are flow charts illustrating the logic used by the main computer.
Figure 14A:
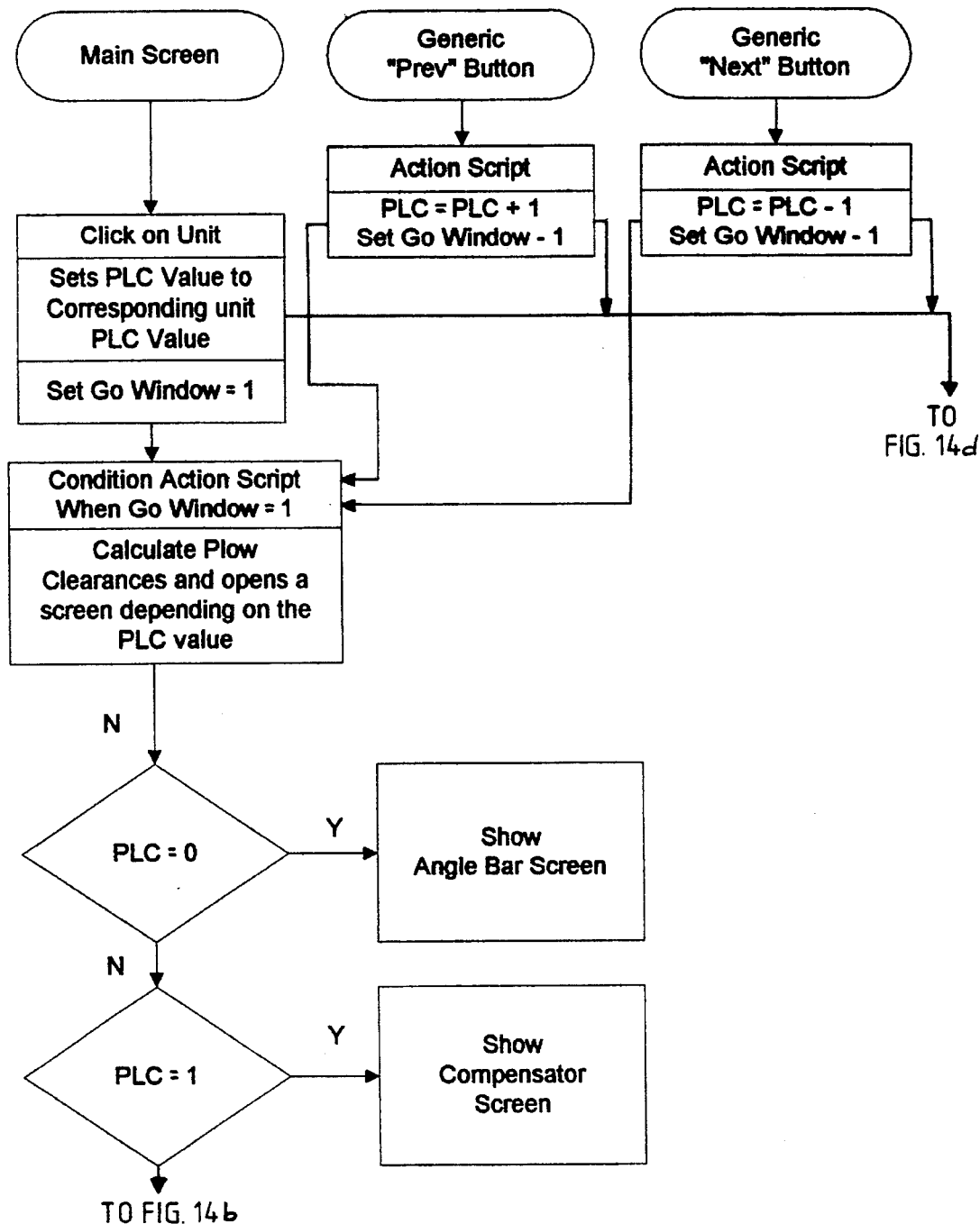
Figure 14B:
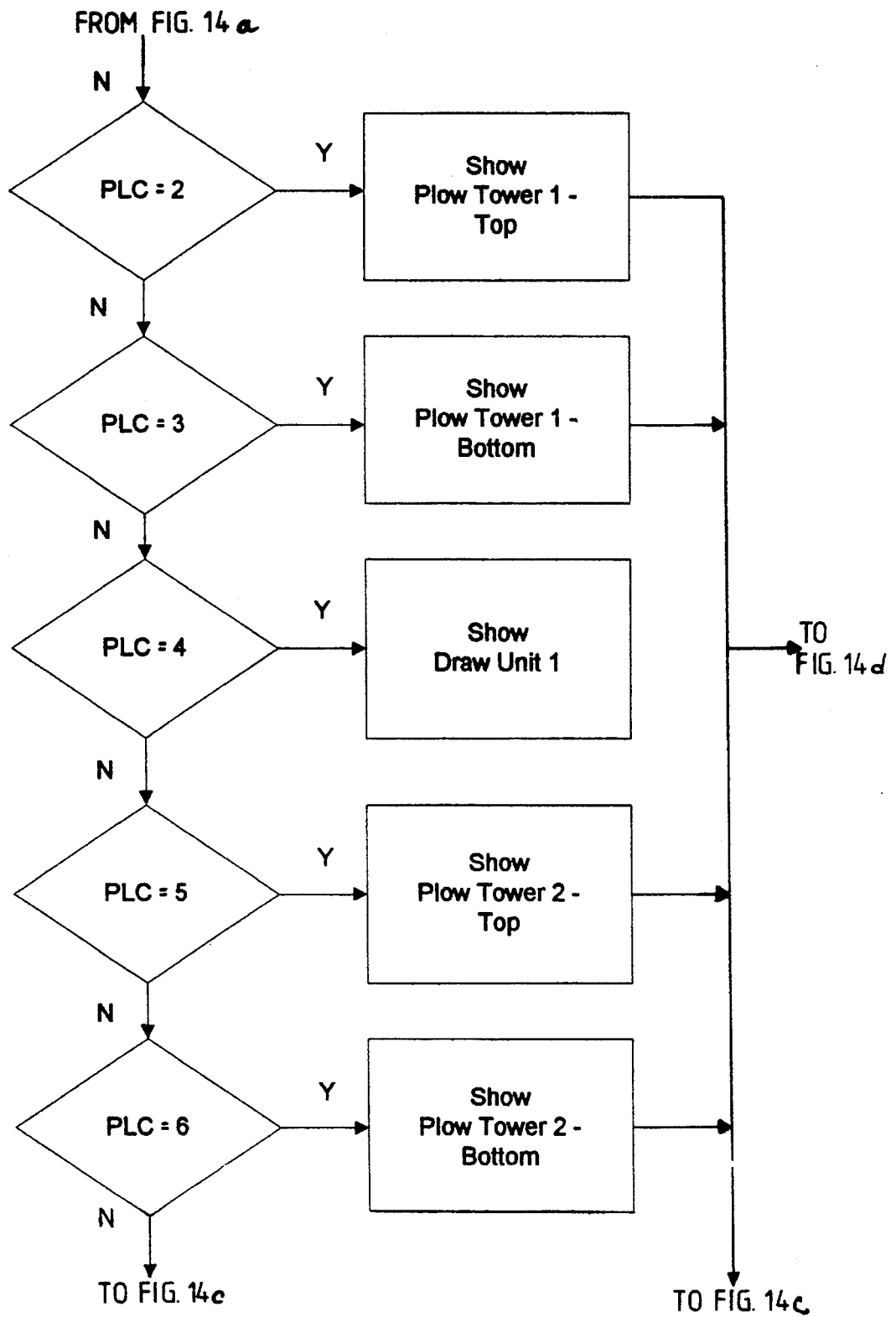
Figure 14C:
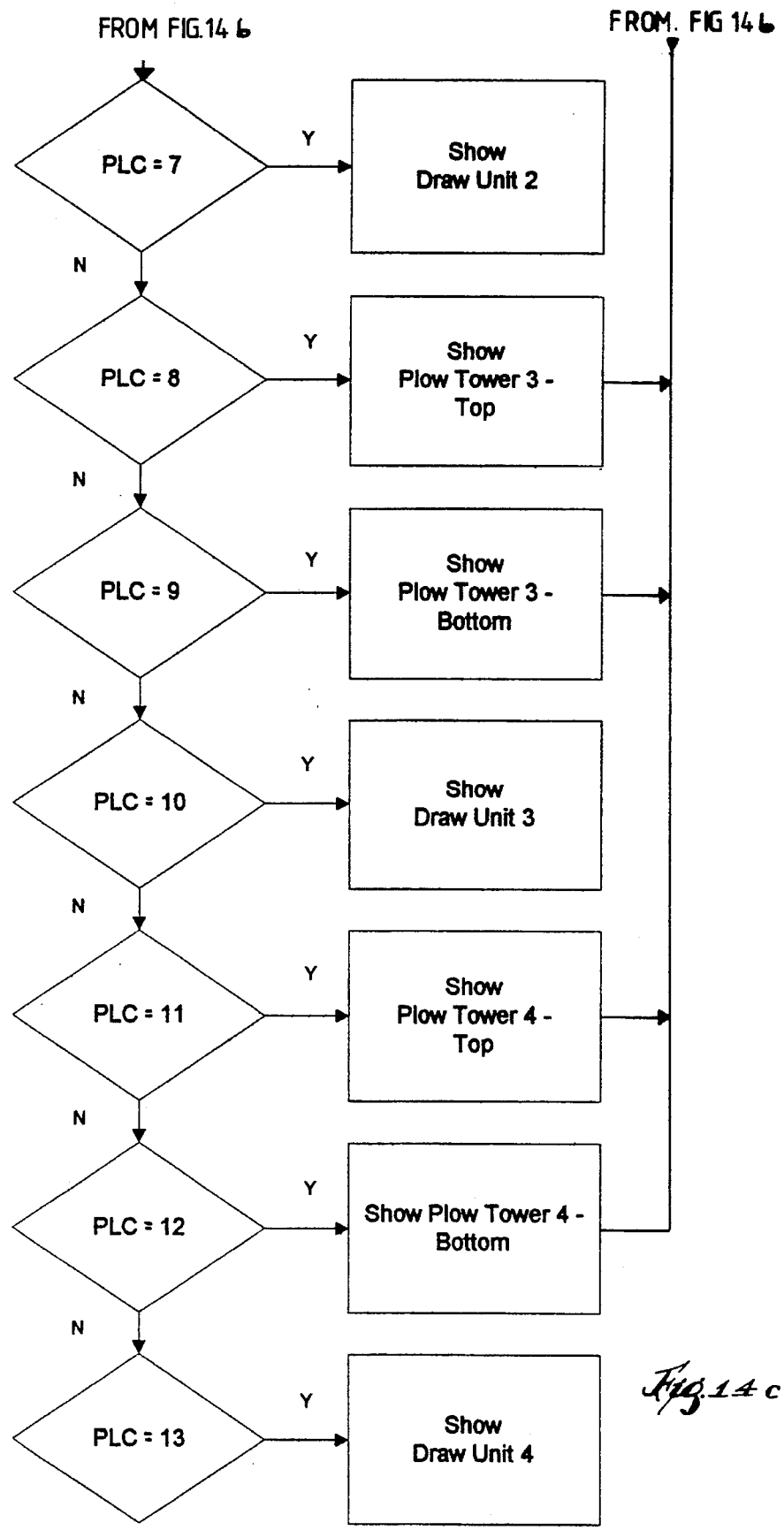
Figure 15A:
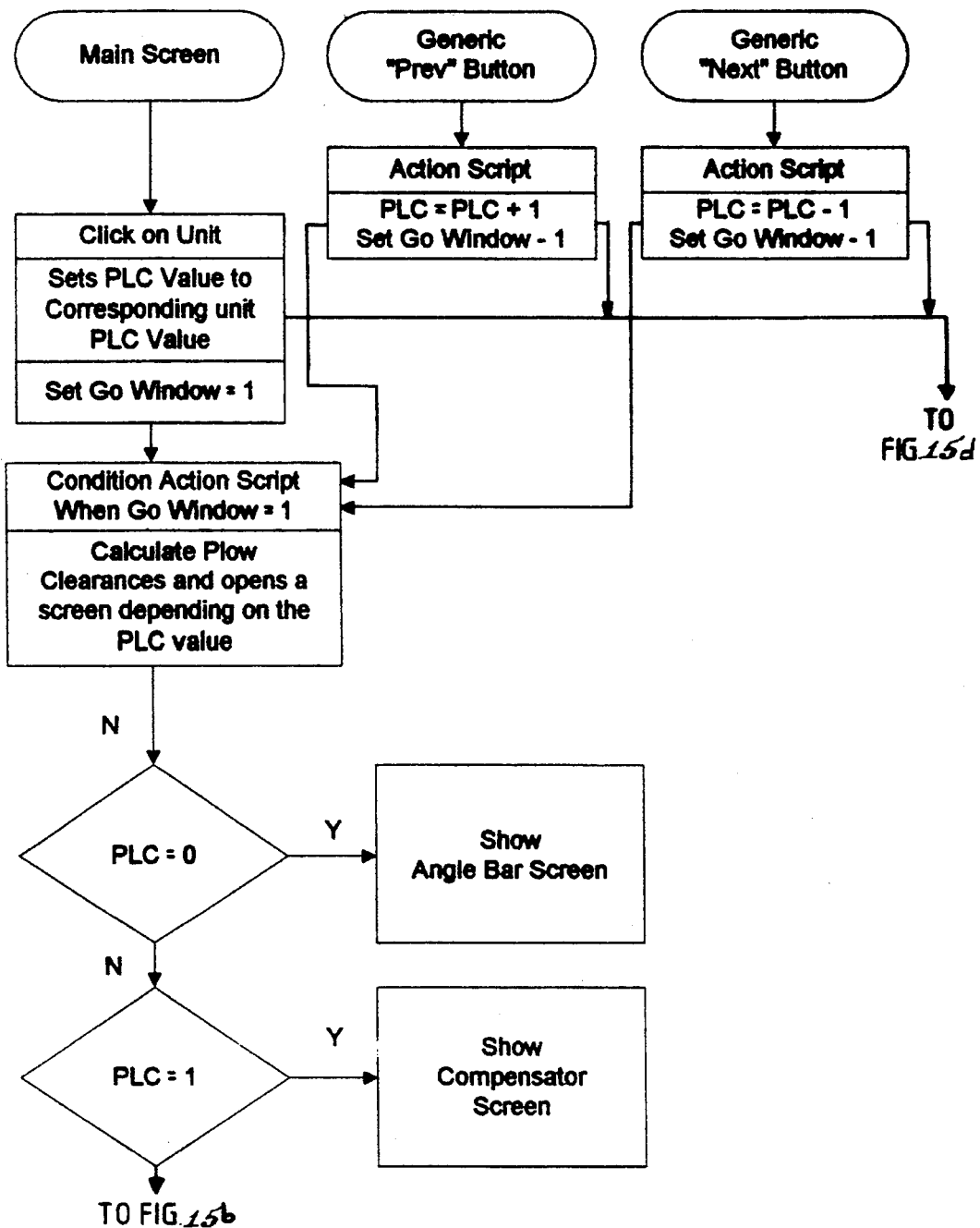
Figure 15:
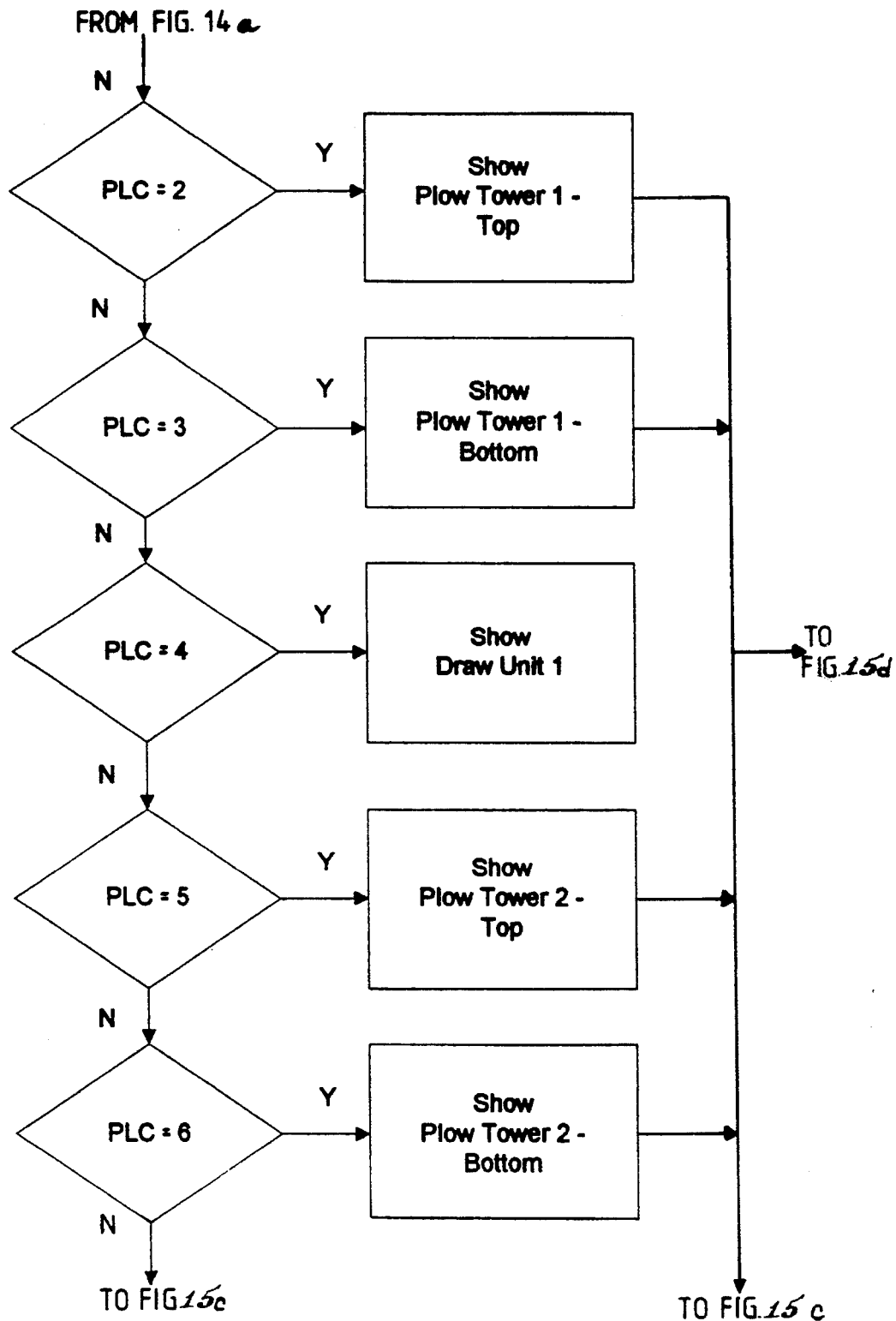
Figure 15C:
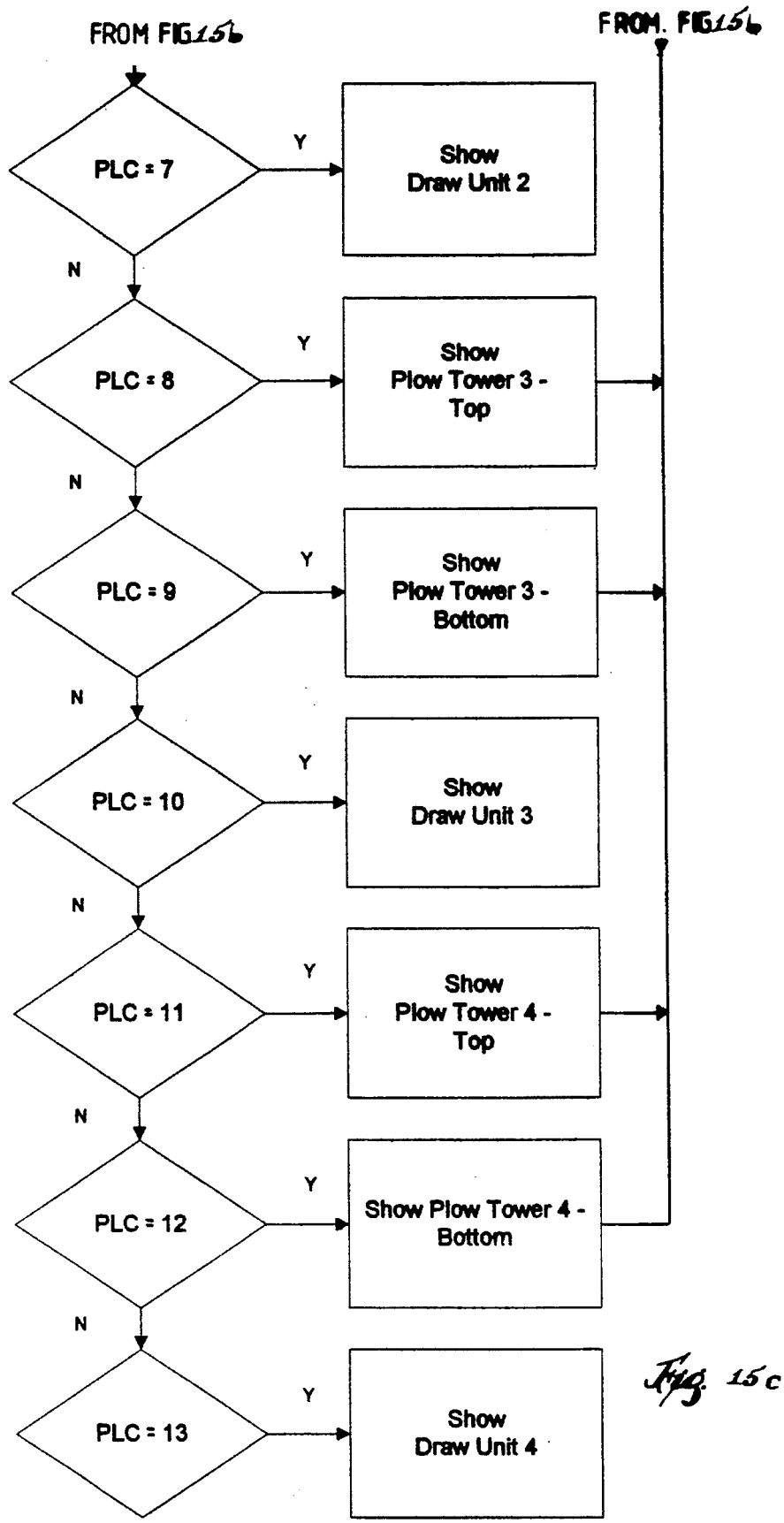

As previously indicated, each PLC 42 has one input slot, one output slot, and two high speed count modules. See FIG. 12. The output slot of each PLC 42 has 8 points which control four motors 26 for forward and reverse operation. The input slot of each PLC 42 has 8 points, of which only 3 are used. These input points of each PLC 42 receive 24 V logic from PLC_X which initiates the following commands in the PLCs 42: Stop all Motors, Calibrate all Motors, and Preset all Motors. There is one input wire for each of these commands. Each high speed count module in each PLC 42 monitors two quadrature encoders 178 (described below in greater detail) associated with the motors 26 and used to determine position. High speed count module 1 monitors two of the encoders 178; e.g., for the first and second motors 26 associated with the particular PLC 42. High speed count module 2 monitors two of the encoders 178; e.g., for the third and fourth motors 26 associated with the particular PLC 42. More particularly, high speed count module 1 has 2 hardwire 24 V DC logic outputs, the first of which is wired to one of the 16 points in the first input slot of PLC_X and signals whether any motor 26 is moving, and the second of which is wired to one of 16 points in the second input slot on PLC_X and signals whether any motor 26 has stalled.

The touch screen 18 receives inputs from a human operator who touches appropriate locations of the touch screen 18 to select a certain display, or to control a folder component by causing operation of the motor 26 associated with the folder component.

The control system 14 further includes a standard keyboard or numerical keypad 46, including number keys, arrow keys, Y and N keys, a decimal key, a delete key, and an enter key, connected to the main computer 22. The keyboard or keypad 46 can be used by an operator, for certain operations, instead of or in conjunction with the touch screen 18. The operator can toggle through (highlight) options shown on the touch screen 18 using the arrow keys on the keyboard or keypad 46, and can hit the enter key on the keypad to make a selection, instead of touching a particular spot on the touch screen 18. Some people may prefer to use a numerical keypad instead of touching numbers on a touch screen; e.g., to specify a position where the operator wants a motor 26 to move.

Figure 3:
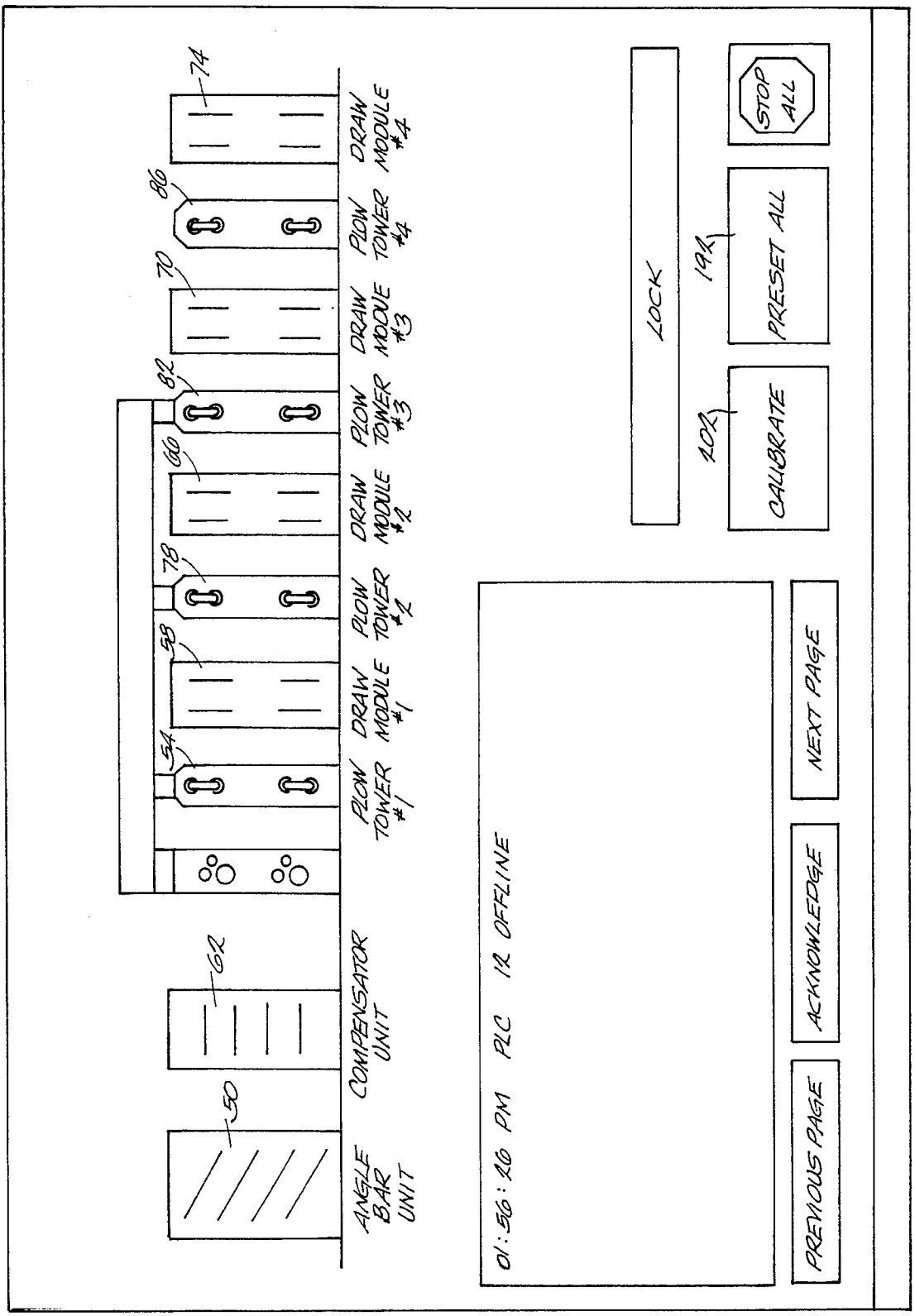
FIG. 3 illustrates a main screen display that can be selected to appear on the touch screen of the folder of FIG. 1.
Figure 4:
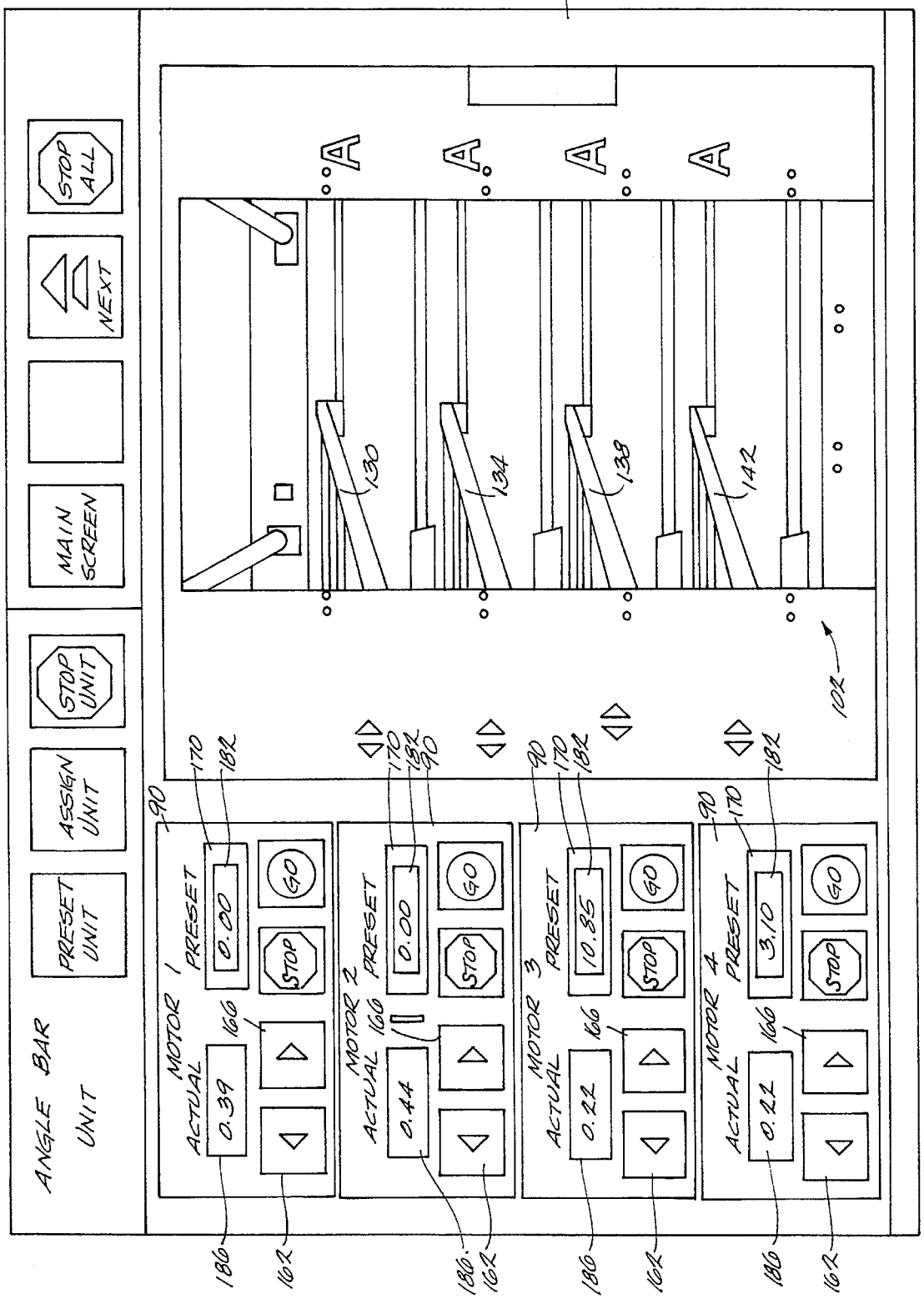
FIG. 4 illustrates an angle bar unit display that can be selected to appear on the touch screen of the folder of FIG. 1, and which can be used to control motors driving angle bars of the folder of FIG. 1.
Figure 5:
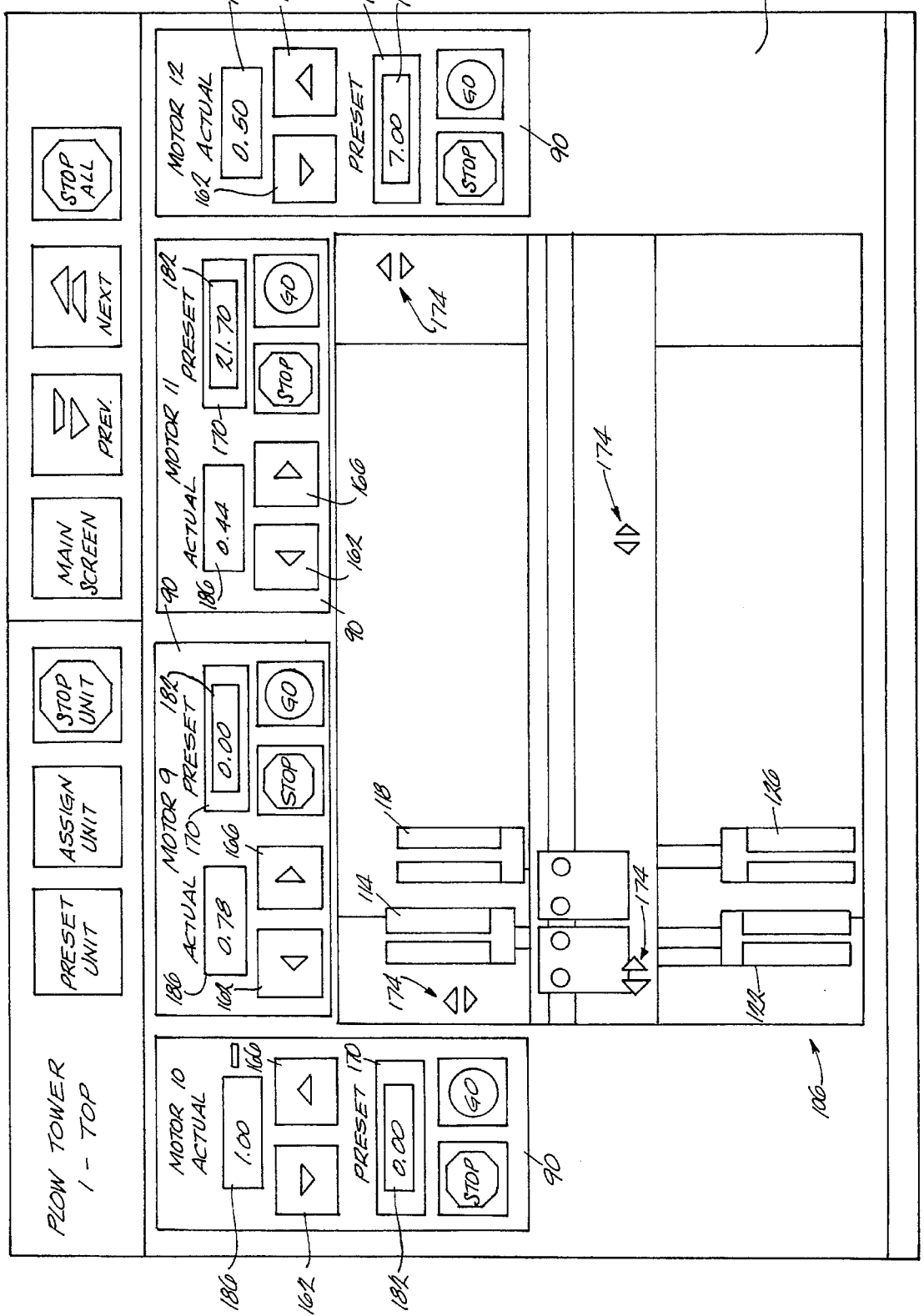
FIG. 5 illustrates a plow unit display that can be selected to appear on the touch screen of the folder of FIG. 1, and which can be used to control motors driving plow heads for one plow tower unit of the folder of FIG. 1. Substantially identical displays are available for controlling motors driving plow heads for other plow tower units of the folder of FIG. 1.
Figure 6:
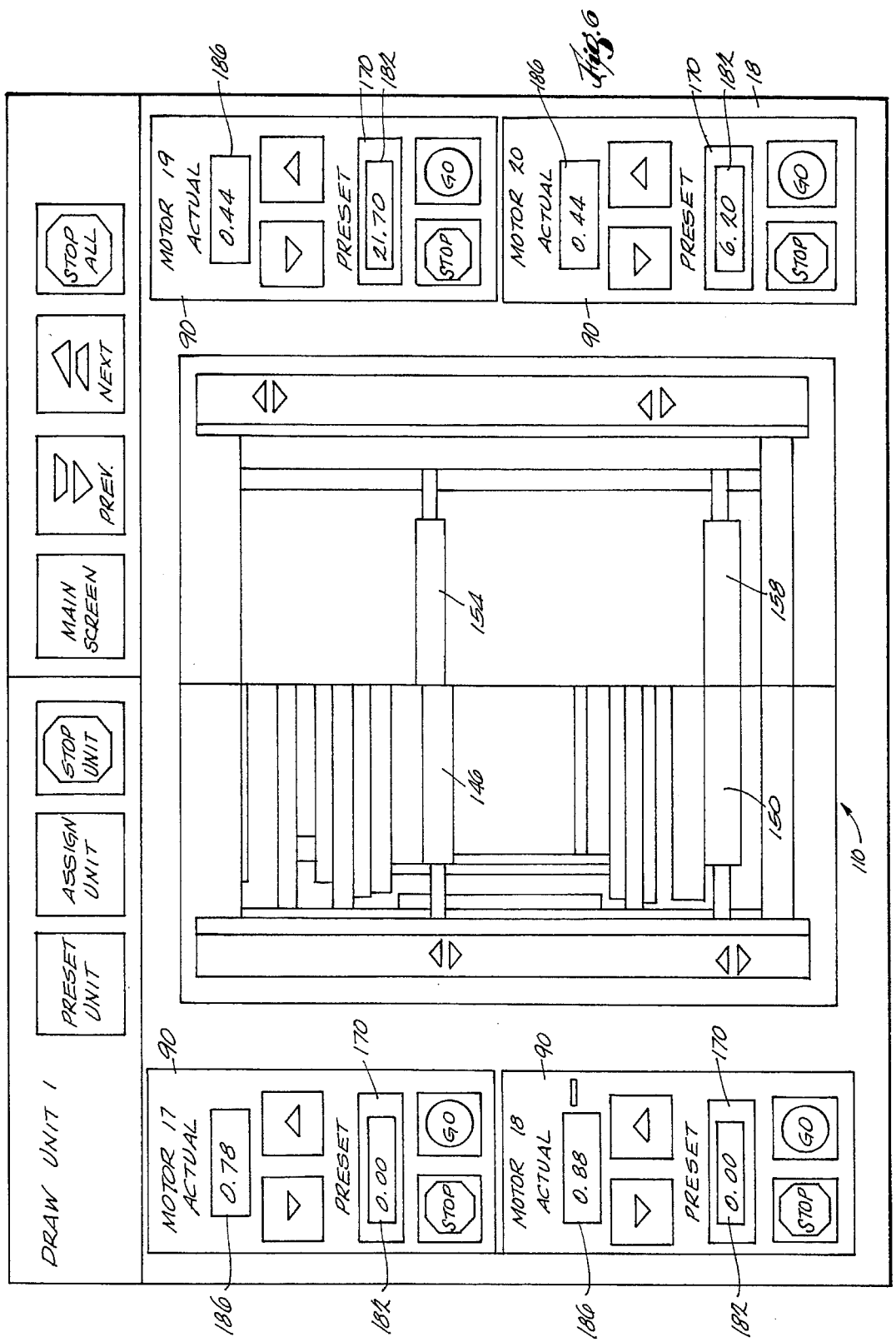
FIG. 6 illustrates a draw unit display that can be selected to appear on the touch screen of the folder of FIG. 1, and which can be used to control motors driving draw rolls for one draw unit of the folder of FIG. 1. Substantially identical displays are available for controlling motors driving draw rolls for other draw units of the folder of FIG. 1.

The control system includes a Main Screen display for the touch screen (FIG. 3) which a human operator can touch to select a folder unit that is to be controlled (e.g., an angle bar unit, a compensator unit, one of the plow tower units, or one of the draw units). The various folder units are displayed on the Main Screen display from left to right in the order in which a web would encounter the actual folder units. A human operator can touch a portion of the touch screen corresponding to the folder unit that the operator would like to control. The control system further comprises a unit control display (see FIGS. 4–6) for each folder unit that can be controlled. For example, if a human operator touches the Angle Bar Unit button 50 on the Main Screen, an Angle Bar Unit control display (see FIG. 4) will appear on the touch screen 18. If the human operator touches the Plow Tower #1 button 54 on the Main Screen, a Plow Tower #1 control display (see FIG. 5) will appear on the touch screen 18. If the human operator touches the Draw Module #1 button 58 on the Main Screen, a Draw Unit #1 control display (see FIG. 6) will appear on the touch screen 18. Unit control displays similar to those shown in FIGS. 4–6 will appear if the operator touches the Compensator Unit button 62, the buttons 66, 70, or 74 for the other draw modules, or the buttons 78, 82, or 86 for the other plow tower units.

For each unit control display (FIGS. 4–6), a control box (or dialogue box) 90 is provided for each motor 26 that can be controlled. The control box 90 receives inputs from a human operator who touches appropriate locations of the control box 90 on the touch screen 18.

For each unit control display, the touch screen 18 displays a photorealistic image of a folder component (e.g., 30, 34, or 38) being controlled by the touch screen 18, and shows movement of that component. An illustration of folder components (e.g., plow heads 30, angle bars 34, draw rolls 38, etc.) for a particular folder unit is displayed on the touch screen, and the illustration of the folder component (e.g., 30, 34, or 38) moves when an operator manipulates the touch screen to cause movement of the actual folder component (e.g., plow heads 30, angle bars 34, draw rolls 38, etc.).

Figure 8:
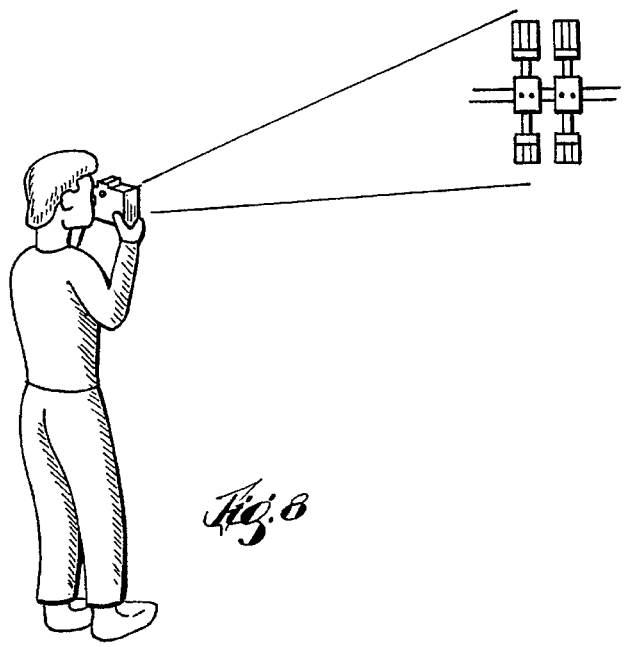
FIGS. 8 and 9 illustrate a method of creating a photorealistic image, for display on the touch screen, of a moveable component in the folder of FIG. 1.
Figure 9:
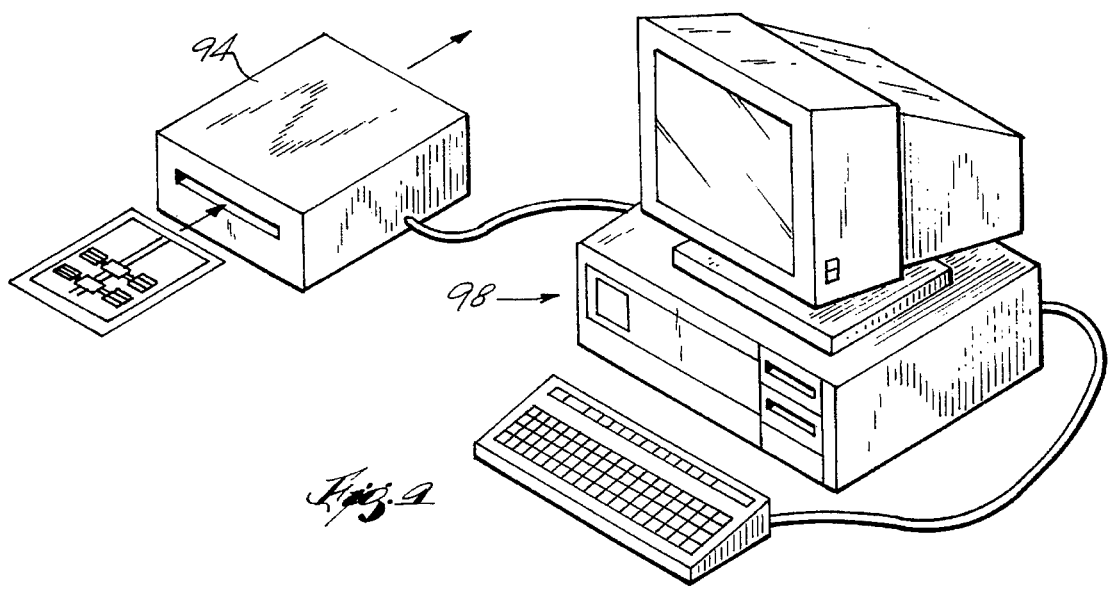

The photo realistic image of each folder component (e.g., plow heads 30, angle bars 34, draw rolls 38, etc.) is generated by taking a picture of the actual folder component (see FIG. 8) using a conventional camera including film (such as a 35mm camera), scanning in the picture (digitizing the picture) using a desktop scanner 94 to create a digitized image (see FIG. 9), and then optionally editing the digitized image (see FIG. 8) to delete superfluous or extraneous parts of the image or to create a simplified image or to add information if necessary (i.e., if a portion of a component was blocked by another component when the picture was taken). Other types of cameras, such as video cameras, can be employed. Further, instead of using a conventional camera and scanning in the picture, a digital camera can employed to produce the digitized image. In the preferred embodiment, the scanner 94 is a Hewlet Packard Scanjet IIC color flatbed scanner. In the preferred embodiment, the digitized image is edited using a computer 98, compatible with the computer 22, and using Photoshop for Windows software, version 2.5, available from Adobe and loaded into the computer 98. The Photoshop software is used to isolate moving parts by deleting background images, and adding information if necessary. Information (e.g., the edited image) is transmitted from the computer 98 to the computer 22 using any conventional technique, such as by using a computer disk, a network, a modem, a direct connection, etc.

The edited image 102, 106, or 110 is what is displayed on the touch screen 18. A portion (e.g., 114, 118, 122, 126, 130, 134, 138, 142, 146, 150, 154, or 158) of the edited image displayed on the touch screen 18 will move if the actual corresponding folder component (e.g., 30, 34, or 38) is moved by one of the motors 26. That is, changes in position of actual folder components (e.g., 30, 34, or 38) results in a change in position of the folder components illustrated on the touch screen 18. If the motor 26 stalls while moving, that motor 26 is highlighted on the touch screen 18. Thus, the touch screen 18 is easy to use in view of the fact that the operator can view the edited image on the touch screen and readily understand what actual component corresponds to this image and what actual component will be moved if the touch screen 18 is manipulated.

Each control box 90 has two arrow keys 162 and 166, and a preset key 170. By holding down one or the other of the arrow keys 162 or 166 in a particular control box 90, the operator can cause the associated motor 26 to move a folder component (plow heads 30, angle bars 34, etc.) in one or the other directions. The control box 90 will have an up arrow key and a down arrow key if the motor 26 it controls moves a folder component vertically. The control box 90 will have a left arrow key and a right arrow key if the motor it controls moves a folder component horizontally. The motor 26 will stop moving when the arrow key 162 or 166 is released. The operator can also cause the motor 26 to move the folder component (e.g., 30, 34, or 38) by touching and dragging certain locations 174 on the touch screen. When the preset key 170 is pressed, a keypad (not shown) appears on the touch screen 18, and the operator can directly enter a number (using a standard unit such as inches or centimeters) which represents a desired position of the folder component. The associated motor 26 will then move the folder component (e.g., 30, 34, or 38) to that position. The control system uses encoder positional feedback to monitor motor positions. More particularly, the folder 10 includes an encoder 178 connected to each motor 26. In the preferred embodiment, each encoder 178 is a Hohner series 896 incremental hollow shaft encoder. Each control box 90 further includes a digital readout 182 which displays the desired position of the folder component connected to the motor 26 being controlled (in the standard unit, e.g. inches), the desired position having been entered by the operator using either the pop up keypad on the touch screen or the arrow keys 162 and 166. Each control box 90 further includes a readout 186 which displays the actual position of the folder component (e.g., 30, 34, or 38) connected to the motor 26 being controlled. There may be a difference between the display on the readout 182 and the readout 186 if, for example, the motor 26 is still moving and has not yet reached the desired location.

The control system 14 also provides repeatability of configurations—the location of each motor controlled folder component for a particular job (hereinafter "job configuration") can be stored and recalled at a later date. Thus, an operator need not control motors 26 individually, one at a time, to set up a job configuration that was previously used. Each job configuration can be assigned a number, which the control system stores. More particularly, the control system 14 includes a random access disk on which job configurations are stored, and further includes a virtual memory file. Job configurations are loaded into the virtual memory file from the random access disk when an operator, using the touch screen 18, retrieves a job configuration that was previously used. When it is desired to retrieve a job configuration, the operator touches the Preset button 190 on a Lead-In Configuration display (FIG. 7) or the Preset All button 192 on the Main Screen display (FIG. 3), and then enters the desired job number into the control system 14 using the touch screen 18. An alarm sounds for ten seconds before the motors 26 start operating, and a strobe light flashes to warn people that the motors 26 are operating automatically. The strobe light turns off when the motors 26 have finished moving. The system thus minimizes makeready time by automatically moving motors 26 to preset positions stored for a job layout. In the illustrated embodiment, the positions to which the motors 26 are accurate within a few thousandths of an inch from the original positions when the job was stored. Accuracy depends on the gearing ratios of the folder components.

The Lead-In Configuration display (FIG. 7) also shows preset and actual positions of lead-in motors; that is, the motors 26 of the angle bar unit and the compensator unit. The Main Screen (FIG. 3) will appear if a Plow button 194 is pressed on the Lead-In Configuration display (FIG. 7).

Calibration of motor set points and motor maximum points are performed by a qualified technician, using the touch screen 18, during installation or servicing (e.g., replacing a motor 26). The technician presses the Calibrate button 198 on the Lead-In Configuration display (FIG. 7), or the Calibrate button 202 on the Main Menu display (FIG. 3), and must then enter a password before access to the calibration screens (not shown) will be granted. Motor positions are in encoder pulses per inch. In the illustrated embodiment, there are 200 encoder pulses per revolution of a motor shaft. In order to allow an operator to specify distance in inches, a proper multiplier must be set using the calibration screens.

Individual address of the virtual memory can be accessed and changed, using the touch screen 18, by a technician. Addresses that a technician might want to access contain, for example, information regarding the number of seconds of operator inaction before a screen saver activates; network motor system timeout, network motor system delay between transmissions, network motor system maximum number of communication attempts, and the keyboard type (keypad or standard). One address contains the password.

Normally, each motor 26 will move for different job layouts. However, if a motor's position is never expected to change, its position can be set, by pressing a Position button in a Motor display (not shown), so that the motor doesn't move when the arrow keys or preset button for the motor is pressed, unless the motor's position is released using the Motor display. Deadband values for motors can also be set using the Motor display. A deadband value is the smallest movement a motor can make. Any calculated move equal to or smaller than the deadband value is not made. The deadband value applies to all motors. The deadband value is set by pressing a Deadband button in the Motor display.

A Network Test display (not shown) allows the technician to monitor, test, and troubleshoot the motors.

The control system further includes a software based collision avoidance system (not shown) which, based on the operator's description of what rollers are mounted on what plow heads, prevents the motors from causing a collision between components without the need for physical limit switches.

An alarm is provided which is capable of emitting different sounds for different conditions. In the illustrated embodiment, the alarm emits a whistle sound when the motors are about to move, and a horn tone when a motor has stalled.

To better enable one of ordinary skill in the art to make and use the invention, a discussion of software (scripts) employed for collision avoidance, for converting encoder pulse units to engineering units, and for calculating plow clearances, will now be provided.

PRESET CONTROL COLLISION AVOIDANCE (Software Doc. PCS 001)

The following Window Application Script is found in each of the Plow Tower Screens.

It was written to prevent the PRESET Positions from being set to values which would cause the Plow Heads to collide with the side frames or with each other, taking into account the added Plow Head Segments.

VARIABLE DEFINITIONS

Motor_ClearanceR_A: (reverse clearance)This is the length of Plow Head segments added to the reverse (left) side of Plow Head A.

Motor_ClearanceF_C: (forward clearance)This is the length of Plow Head segments added to the forward (right) side of Plow Head C.

Motor_MinusLimitOffset_C: This is the value given to Motor_C at its lower limit. If Plow Head_A is at its lower limit (0.00) then Plow Head_C has to have its lower limit at one Plow Head width forward of Plow Head_A, or else a collision would occur.

Motor_ClearanceF_A: This is the length of Plow Head segments added to the forward (right) side of Plow Head A + the length of Plow Head segments added to the reverse (left) side of Plow Head C + Motor_MinusLimitOffset_C).

Motor_ClearanceR_C = Motor_ClearanceF_A.

SCRIPT OPERATION

1. If Motor_Preset_A is too close to its lower soft limit, taking into account added plow heads (Motor_ClearanceR_A), then Motor_Preset_A moves forward a minimum acceptable clearance (Motor_ClearanceR_A) from its reverse soft limit.

2. If Motor_Preset_C is now too close to Motor_Preset_A, then Motor_Preset_C moves forward to a minimum acceptable clearance from Motor_Preset_A, which is calculated by (Motor_Preset_A + Motor_ClearanceF_A).

3. Now if Motor_Preset_C is too close to its forward soft limit, taking into account added plow heads (Motor_ClearanceF_C), then Motor_Preset_C reverses a minimum acceptable clearance from its forward soft limit (Motor_ClearanceF_C).

4. Step 4 keeps the correct distance between Presets A and C as in Step No. 2 above. This is done again so as to compensate for reverse movement of Motor_Preset_C in the event that C needs to reverse to compensate for clearance.

SCRIPT REFERENCE

Note: Motor clearances for the below script (ie. Motor_ClearanceF_C) are already calculated by a different Window Action Script in the Generic Configure Screen.

```
IF Motor_Preset_A - Motor_ClearanceR_A < 0 THEN
   Motor_Preset_A = Motor_ClearanceR_A;
ENDIF;

IF Motor_Preset_A + Motor_ClearanceF_A > Motor_Preset_B THEN
   Motor_Preset_B = Motor_Preset_A + Motor_ClearanceF_A;
ENDIF;

IF Motor_Preset_B + Motor_ClearanceF_B > MotorPlusLimit_B THEN
   Motor_Preset_B = MotorPlusLimit_B - Motor_ClearanceF_B;
ENDIF;

IF Motor_Preset_A + Motor_ClearanceF_A > Motor_Preset_B THEN
   Motor_Preset_A = Motor_Preset_B -  Motor_ClearanceF_A;
ENDIF;
```

{ Software Doc. PCS 002 }

CONVERTING ENCODER PULSE UNITS TO ENGINEERING UNITS

OVERVIEW

The Preset Position and Actual Position is measured in encoder pulses. Before they can be displayed they must be converted to the current engineering units that the operator is using (ie.mm or inches). This conversion is done using a scale factor.

The User inputs Preset Position values in Engineering Units of millimeters or inches. These E.U.'s must then be converted back to encoder pulse values. This is accomplished using a data change script. So after the User has input a value it is immediately converted to encoder pulse values.

Finally, when the user clicks on the Preset button to change the existing Preset value, the value you see might not correspond to the actual or slider position. It must be in engineering units and not in encoder pulses. This value must be contunually updated, and is done so, in an application script every five seconds.

VARIABLE DEFINITIONS

Motor_Preset: This is an DDE tag whose units are in encoder pulses. The tag is displayed in engineering units by an expression which divides the raw preset value by a scale factor (Motor_Scale).

Motor_Scale: This is a DDE Integer Tag which holds the scale value of a particular motor. The scale value is used to associate on-screen displacement against actual motor encoder pulses.

Motor_PresetIn: This is an intermediate tag which accepts user inputs (in engineering units). When the value is changed in this tag (by user input), a data change script is executed. This script makes the Motor_Preset = Motor_PresetIn * Motor_Scale.

What is happening here is, by changing the value of Motor_PresetIn (User entry) the script correctly changes the value of Motor_Preset. So the user is tricked into thinking that he/she is changing the value of Motor_Preset directly.

APPLICATION SCRIPT REFERENCE

```
Motor_PresetIn_A = Motor_Preset_A / Motor_Scale_A;
Motor_PresetIn_B = Motor_Preset_B / Motor_Scale_B;
Motor_PresetIn_C = Motor_Preset_C / Motor_Scale_C;
Motor_PresetIn_D = Motor_Preset_D / Motor_Scale_D;
```

DATA CHANGE SCRIPT REFERENCES

```
Motor_Preset_A = Motor_PresetIn_A * Motor_Scale_A;
Motor_Preset_B = Motor_PresetIn_B * Motor_Scale_B;
Motor_Preset_C = Motor_PresetIn_C * Motor_Scale_C;
Motor_Preset_D = Motor_PresetIn_D * Motor_Scale_D;
```

CALCULATING PLOW CLEARANCES {Software Doc. PCS 003}

Plow Clearances are needed to prevent plow heads from colliding with each other. As You add Plow Segments, the clearance between the plows must increase to accomondate for them. For example, if you are in the Configure Screen and you add two Plow Segments to the right of Plow A, then Plow C must be at least a width of two segments from Plow A.

The following script is found in the Window Application Script of the "Configure" screen. The script runs "on hide", so after segments have been added or removed by the user, the plow clearances are calculated while returning back to the Plow Tower screen.

A script in the plow tower screen then uses the calculated plow clearance values for preset control collision aviodance.

The plow clearance variables are as follows:
- Motor_ClearanceR_A
- Motor_ClearanceF_C
- Motor_ClearanceF_A
- Motor_ClearanceR_C
- Motor_MinusLimitOffset_C Use and explanation of these variables are explained in {Software Doc. PCS 001}

VARIABLE DEFINITIONS

Motor A

| | |
|---|---|
| MA_Lf_1: | A descrete value (1 or 0) indicating the presence of the first segment to the left of Motor_A. |
| MA_Lf_1: | A descrete value (1 or 0) indicating the presence of the second segment to the left of Motor_A. |
| MA_Lf_1: | A descrete value (1 or 0) indicating the presence of the third segment to the left of Motor_A. |
| MA_Lf_Rotary: | A descrete value (1 or 0) indicating the presence of a Rotary Plow to the left of Motor_A. |
| MA_Lf_Shoe: | A descrete value (1 or 0) indicating the presence of a Shoe Plow to the left of Motor_A. |
| MA_Rt_1: | A descrete value (1 or 0) indicating the presence of the first segment to the right of Motor_A. |
| MA_Rt_1: | A descrete value (1 or 0) indicating the presence of the second segment to the right of Motor_A. |
| MA_Rt_1: | A descrete value (1 or 0) indicating the presence of the third segment to the right of Motor_A. |
| MA_Rt_Rotary: | A descrete value (1 or 0) indicating the presence of a Rotary Plow to the right of Motor_A. |
| MA_Rt_Shoe: | A descrete value (1 or 0) indicating the presence of a Shoe Plow to the right of Motor_A. |

Motor C

| | |
|---|---|
| MC_Lf_1: | A descrete value (1 or 0) indicating the presence of the first segment to the left of Motor_C. |
| MC_Lf_1: | A descrete value (1 or 0) indicating the presence of the second segment to the left of Motor_C. |

MC_Lf_1: A descrete value (1 or 0) indicating the presence of the third segment to the left of Motor_C.
MC_Lf_Rotary: A descrete value (1 or 0) indicating the presence of a Rotary Plow to the left of Motor_C.
MC_Lf_Shoe: A descrete value (1 or 0) indicating the presence of a Shoe Plow to the left of Motor_C.
MC_Rt_1: A descrete value (1 or 0) indicating the presence of the first segment to the right of Motor_C.
MC_Rt_1: A descrete value (1 or 0) indicating the presence of the second segment to the right of Motor_C.
MC_Rt_1: A descrete value (1 or 0) indicating the presence of the third segment to the right of Motor_C.
MC_Rt_Rotary: A descrete value (1 or 0) indicating the presence of a Rotary Plow to the right of Motor_C.
MC_Rt_Shoe: A descrete value (1 or 0) indicating the presence of a Shoe Plow to the right of Motor_C.

Width_Seg3: This is the width of a plow head segment, expressed in encoder pulses
Width_Rotary: This is the width of a plow Rotary Plow, expressed in encoder pulses
Width_Shoe: This is the width of a plow Shoe Plow, expressed in encoder pulses

SCRIPT OPERATION

By adding each one of the above segments (on screen), to the left or right of Motor_A or Motor_C, a value of 1 is set in each descrete tag. By multiplying the width of each segment by this descrete value (1), the segment width will be part of the equation. When a segment is not added, the descrete value will be 0 and so the segment width will be left out of the equation.

The forward clearance of Motor_A is the width of the number of segments added to the right of Motor_A + the width of the number of segments added to the left of Motor_C + the minimum distance that Motor_C must be from Motor_A with no added Plow Head Segments (Motor_MinusLimitOffset_C).

Logically, the Forward Clearance of Motor_A is equal to the Reverse Clearance of Motor_C.

The equations are now able to calculate forward and reverse clearances, depending on whether or not particular segments are added.

SCRIPT REFERENCE

Motor_ClearanceR_A = ( MA_Lf_1 * Width_Seg3 ) + ( MA_Lf_2 * Width_Seg3 ) + ( MA_Lf_3 * Width_Seg3 ) + ( MA_Lf_Rotary * Width_Rotary ) + ( MA_Lf_Shoe * Width_Shoe );

Motor_ClearanceF_C = ( MC_Rt_1 * Width_Seg3 ) + ( MC_Rt_2 * Width_Seg3 ) + ( MC_Rt_3 * Width_Seg3 ) + ( MC_Rt_Rotary * Width_Rotary ) + ( MC_Rt_Shoe * Width_Shoe );

Motor_ClearanceF_A = ( MA_Rt_1 * Width_Seg3 ) + ( MA_Rt_2 * Width_Seg3 ) + ( MA_Rt_3 * Width_Seg3 ) + ( MA_Rt_Rotary * Width_Rotary ) + ( MA_Rt_Shoe * Width_Shoe )+ ( MC_Lf_1 * Width_Seg3 ) + ( MC_Lf_2 * Width_Seg3 ) + ( MC_Lf_3 * Width_Seg3 ) + ( MC_Lf_Rotary * Width_Rotary ) + ( MC_Lf_Shoe * Width_Shoe ) + Motor_MinusLimitOffset_C;

Motor_ClearanceR_C = Motor_ClearanceF_A;

While the preferred embodiments of the invention have been shown and described, it will be obvious to those skilled in the art that changes and modifications may be made therein without departing from the spirit of the invention, the scope of which is defined by the appended claims.

We claim:

1. A method of manufacturing a display for a touch screen control system which is used to control plow heads in a web folder machine, said method comprising the steps of:

providing a touch screen interface;

taking a picture of the plow head;

digitizing the picture to create a digitized image of the plow head; and displaying the digitized image of the plow head on the touch screen interface.

2. A method in accordance with claim 1 and further including the step of causing the digitized image of the plow head to move on the touch screen when the actual plow head moves.

3. A method in accordance with claim 1 and further comprising the step of editing the digitized image, and wherein said displaying step comprises displaying the edited digitized image.

4. A method in accordance with claim 1 wherein said touch screen interface acts as a computer mouse.

5. A method of manufacturing a web folder machine, said method comprising the steps of:

providing a plurality of folder units including an angle bar unit, a compensator unit, a plow unit having plow heads, and a draw unit, and connecting a motor to each plow head such that operation of the motor causes movement of the plow head;

providing a control system including the steps of providing a computer, a touch screen interface, and a plurality of PLCs, connecting the computer to the touch screen interface and to the PLCs, and connecting four of the motors to each PLC;

taking a picture of at least one of the plow heads;

digitizing the picture to create a digitized image of the plow head; and displaying the digitized image of the plow head on the touch screen interface such that the displayed digitized image moves on the touch screen interface when the actual plow head moves.

6. A method in accordance with claim 5 and further comprising the step of editing the digitized image, and wherein said displaying step comprises displaying the edited digitized image.

7. A method in accordance with claim 5 wherein said touch screen interface acts as a computer mouse.

8. A folder machine for folding a travelling web, said folder machine comprising:

a plurality of plow heads;

a computer;

a plurality of PLCs connected to said computer;

a plurality of motors connected to each PLC and respectively drivingly connected to the plow heads for selectively moving the plow heads; and a touch screen interface connected to said computer, wherein a photorealistic image of a plow head is displayed on said touch screen, which photorealistic image moves on the display in response to movement of one of said plow heads.

9. A folder in accordance with claim 8 wherein said photorealistic image is created by taking a picture of one of the plow heads, digitizing the picture to create a digitized image, and editing the digitized image.

10. A folder in accordance with claim 8 wherein said touch screen interface acts as a computer mouse.

11. A folder machine in accordance with claim 8 and further comprising an encoder connected to each motor, each encoder transmitting to one of said PLCs a predetermined number of pulses per motor revolution, and wherein the photorealistic image displayed on the touch screen moves a distance proportional to the number of pulses transmitted by the encoder connected to the motor driving said one plow head.

12. A folder machine in accordance with claim 8 and further comprising a software based collision avoidance system including means for receiving an operator's description of what rollers are mounted on what plow heads, and means for preventing the motors from moving a plow head to a position where a collision would occur, without the need for physical limit switches.

13. A folder machine in accordance with claim 8 and further comprising means providing repeatability of configurations, wherein the position of each motor driven plow head for a particular job is selectively stored, and recalled at a later date.

14. A folder machine in accordance with claim 8 and further comprising means for displaying, on said touch screen interface, a main screen display, different from a display containing the photorealistic image, which main screen display shows a representation of an angle bar unit, a compensator unit, and plow units and draw units arranged on the screen from left to right in an order corresponding to the order a web would encounter the actual angle bar unit, compensator unit, and plow units and draw units controlled by said control system.

15. A folder machine in accordance with claim 14 wherein, when an operator touches the representation of one of the plow units on the main screen, the display including the photorealistic image of the plow head appears.

16. A folder machine in accordance with claim 15 wherein the display including the photorealistic image also includes a control box for each motor that can be controlled using that display, each control box having two arrow keys, wherein by holding down one or the other of the arrow keys, an operator can cause the motor to move a plow head in one or the other directions.

17. A folder machine in accordance with claim 16 wherein each control box will have an up arrow key and a down arrow key if the motor it controls moves a plow head vertically, and will have instead a left arrow key and a right arrow key if the motor it controls moves a plow head horizontally.

18. A folder machine in accordance with claim 16 wherein an operator can cause one of the motors to move the plow head connected to that motor by touching and dragging a certain location on the touch screen.

19. A folder machine in accordance with claim 16 wherein the display including the photorealistic image further includes a preset key which, when pressed, causes a keypad appears on the touch screen, using which an operator can directly enter a number which represents a desired position of a plow head.

20. A method of creating a display for a touch screen control system which is used to control a movable folder unit in a web folder machine, said method comprising the steps of:

providing a touch screen interface;

taking a picture of the movable folder unit;

digitizing the picture to create a digitized image of the movable folder unit; and displaying the digitized image of the movable folder unit on the touch screen interface.

21. A method in accordance with claim 20 and further including the step of causing the digitized image of the movable folder unit to move on the touch screen when the actual movable folder unit moves.

22. A method in accordance with claim 20 and further comprising the step of editing the digitized image, and wherein said displaying step comprises displaying the edited digitized image.

23. A method in accordance with claim 20 wherein said touch screen interface acts as a computer mouse.

24. A method of operating a web folder machine, having a plurality of movable folder units, the movable folder units including an angle bar unit, a compensator unit, a plow unit having plow heads, and a draw unit, and motors respectively connected to a plurality of the movable folder units such that operation of the motors causes selective movement of the movable folder units, the method comprising the steps of:

providing a control system including a computer, a touch screen interface, and a plurality of PLCs, the computer being connected to the touch screen interface and to the PLCs, and the PLCs being connected to the motors for controlling the motors;

taking a picture of at least one of the movable folder units;

digitizing the picture to create a digitized image of the movable folder unit; and displaying the digitized image of the movable folder unit on the touch screen interface such that the displayed digitized image moves on the touch screen interface when the movable folder unit moves.

25. A method in accordance with claim 24 and further comprising the step of editing the digitized image, and wherein said displaying step comprises displaying the edited digitized image.

26. A method in accordance with claim 24 wherein said touch screen interface acts as a computer mouse.

27. A folder machine for folding a travelling web, said folder machine comprising:

a plurality of movable folder units;

a computer;

a plurality of PLCs connected to said computer;

a plurality of motors connected to each PLC and respectively drivingly connected to the movable folder units for selectively moving the movable folder units; and a touch screen interface connected to said computer, wherein a photorealistic image of a movable folder unit is displayed on said touch screen, which photorealistic image moves on the display in response to movement of one of said movable folder units.

28. A folder in accordance with claim 27 wherein said photorealistic image is created by taking a picture of one of the movable folder units, digitizing the picture to create a digitized image, and editing the digitized image.

29. A folder in accordance with claim 27 wherein said touch screen interface acts as a computer mouse.

30. A folder machine in accordance with claim 27 and further comprising an encoder connected to each motor, each encoder transmitting to one of said PLCs a predetermined number of pulses per motor revolution, and wherein the photorealistic image displayed on the touch screen moves a distance proportional to the number of pulses transmitted by the encoder connected to the motor driving said one movable folder unit.

31. A folder machine in accordance with claim 27 and further comprising a software based collision avoidance system including means for receiving an operator's description of what rollers are mounted on what plow heads, and means for preventing the motors from moving a plow head to a position where a collision would occur, without the need for physical limit switches.

32. A folder machine in accordance with claim 27 and further comprising means providing repeatability of configurations, wherein the position of each motor driven movable folder unit for a particular job is selectively stored, and recalled at a later date.

33. A folder machine in accordance with claim 27 and further comprising means for displaying, on said touch screen interface, a main screen display, different from a display containing the photorealistic image, which main screen display shows a representation of a plurality of movable folder units such as an angle bar unit, a compensator unit, plow units, and draw units arranged on the screen from left to right in an order corresponding to the order a web would encounter the actual movable folder units controlled by said control system.

34. A folder machine in accordance with claim 33 wherein, when an operator touches the representation of one of the movable folder units on the main screen, the display including the photorealistic image of the movable folder unit appears.

35. A folder machine in accordance with claim 34 wherein the display including the photorealistic image also includes a control box for each motor that can be controlled using that display, each control box having two arrow keys, wherein by holding down one or the other of the arrow keys, an operator can cause the motor to move a movable folder unit in one or the other directions.

36. A folder machine in accordance with claim 35 wherein each control box will have an up arrow key and a down arrow key if the motor it controls moves a plow head vertically, and will have instead a left arrow key and a right arrow key if the motor it controls moves a plow head horizontally.

37. A folder machine in accordance with claim 35 wherein an operator can cause one of the motors to move the movable folder unit connected to that motor by touching and dragging a certain location on the touch screen.

38. A folder machine in accordance with claim 35 wherein the display including the photorealistic image further includes a preset key which, when pressed, causes a keypad to appear on the touch screen, using which an operator can directly enter a number which represents a desired position of a movable folder unit.

39. A display for a control system indicating the position of movable folder units, said display including:

a photorealistic image of a movable folder unit;

means for inputting a desired preset position of the movable folder unit;

a first numerical display of said preset position; and a second numerical display of the actual position of said movable folder unit.

* * * * *